(12) United States Patent
Gautam et al.

(10) Patent No.: US 12,716,798 B2
(45) Date of Patent: Aug. 25, 2026

(54) SYSTEM AND METHOD FOR FAULT DETECTION IN SENSORS

(71) Applicant: NXP USA, Inc., Austin, TX (US)

(72) Inventors: Bodh Raj Gautam, Solan (IN); Vikram Varma, Noida (IN)

(73) Assignee: NXP USA, INC., Austin, TX (US)

( * ) Notice: Subject to any disclaimer, the term of this patent is extended or adjusted under 35 U.S.C. 154(b) by 301 days.

(21) Appl. No.: 18/638,886

(22) Filed: Apr. 18, 2024

(65) Prior Publication Data

US 2025/0116561 A1 Apr. 10, 2025

(30) Foreign Application Priority Data

Oct. 5, 2023 (IN) ............................. 202341066957

(51) Int. Cl.
*G01L 27/00* (2006.01)
*G01L 9/00* (2006.01)

(52) U.S. Cl.
CPC .......... *G01L 27/007* (2013.01); *G01L 9/0072* (2013.01)

(58) Field of Classification Search
CPC ......... G01L 27/00; G01L 27/007; G01L 9/00; G01L 9/0041; G01L 9/0072; G01R 27/00; G01R 27/02; G01R 27/26; G01R 27/2605; G01D 5/00; G01D 5/12; G01D 5/14; G01D 5/24
USPC .................................................. 324/500, 537
See application file for complete search history.

(56) References Cited

U.S. PATENT DOCUMENTS 8,305,094 B2 * 11/2012 Chang .................... G01R 31/70 324/714
9,075,094 B2 * 7/2015 Entringer ................ G01L 5/165
9,874,609 B2 1/2018 Rasbornig et al.
10,436,659 B2 10/2019 Dawson et al.
12,189,016 B2 * 1/2025 Tangredi ................ G01D 21/00
2010/0052695 A1 * 3/2010 Holzmann .............. H04M 1/24 324/537
2012/0038366 A1 * 2/2012 Froman ............. G01R 31/2829 324/537
2013/0187668 A1 * 7/2013 Entringer ........... G01R 27/2605 324/679
2014/0111221 A1 * 4/2014 Wang ................... G11B 17/056 324/537

(Continued)

FOREIGN PATENT DOCUMENTS

DE 112014007218 B4 * 11/2019 ............ H01H 36/00
WO 2022069233 A1 4/2022

*Primary Examiner* — Hoai-An D. Nguyen

(57) ABSTRACT

A sensing circuit is coupled to a sensor comprising first and second sensing elements. The sensing circuit detects changes in physical parameters by determining change in attributes of first and second sensing elements. The sensing circuit may include a switching circuit, first and second test elements, and a converter. During a normal mode, the switching circuit couples the first and second sensing elements to the converter to generate a first parameter value. During a fault diagnosis mode, the switching circuit couples one of (i) a first test element and the second sensing element and (ii) a second test element and the first sensing element to the converter to generate a second parameter value. The second parameter value is compensated to obtain a third parameter value that is further compared with the first parameter value to obtain a differential value. Based on the differential value, faults in the sensor are detected.

20 Claims, 9 Drawing Sheets

(56) References Cited

U.S. PATENT DOCUMENTS

2021/0155473 A1 5/2021 Holbein et al.
2025/0130290 A1* 4/2025 Yi .......................... G01R 31/52

* cited by examiner

| Faulty bond wire | Plurality of reference ranges |
|---|---|
| B1 | [0, 0.8] |
| B2 | [-1, -0.6] |
| B3 | [-0.3, 0] |
| B4 | [-0.3, 0] |
| B5 | [0, 0.4] |
| B6 | [-0.6, -0.5] |

SYSTEM AND METHOD FOR FAULT DETECTION IN SENSORS

CROSS-REFERENCE TO

This application claims the priority under 35 U.S.C. § 119 of India patent application No. 202341066957, filed on Oct. 5, 2023, the contents of which are incorporated by reference herein.

FIELD OF USE

The present disclosure relates generally to electronic circuits, and, more particularly, to a system and method for fault detection in sensors.

BACKGROUND

Sensors are utilized to sense or detect physical parameters such as pressure, temperature, and the like. The sensors are included in an electronic device along with various functional circuits that execute critical operations based on the output of the sensors. Such sensors, however, are prone to faults that may lead to impaired functioning of the sensors and thereby impact the reliability of the output of the sensors. Further, the utilization of such sensor outputs by the functional circuits impacts the operations executed by the functional circuits.

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

DETAILED DESCRIPTION

Figure 1:
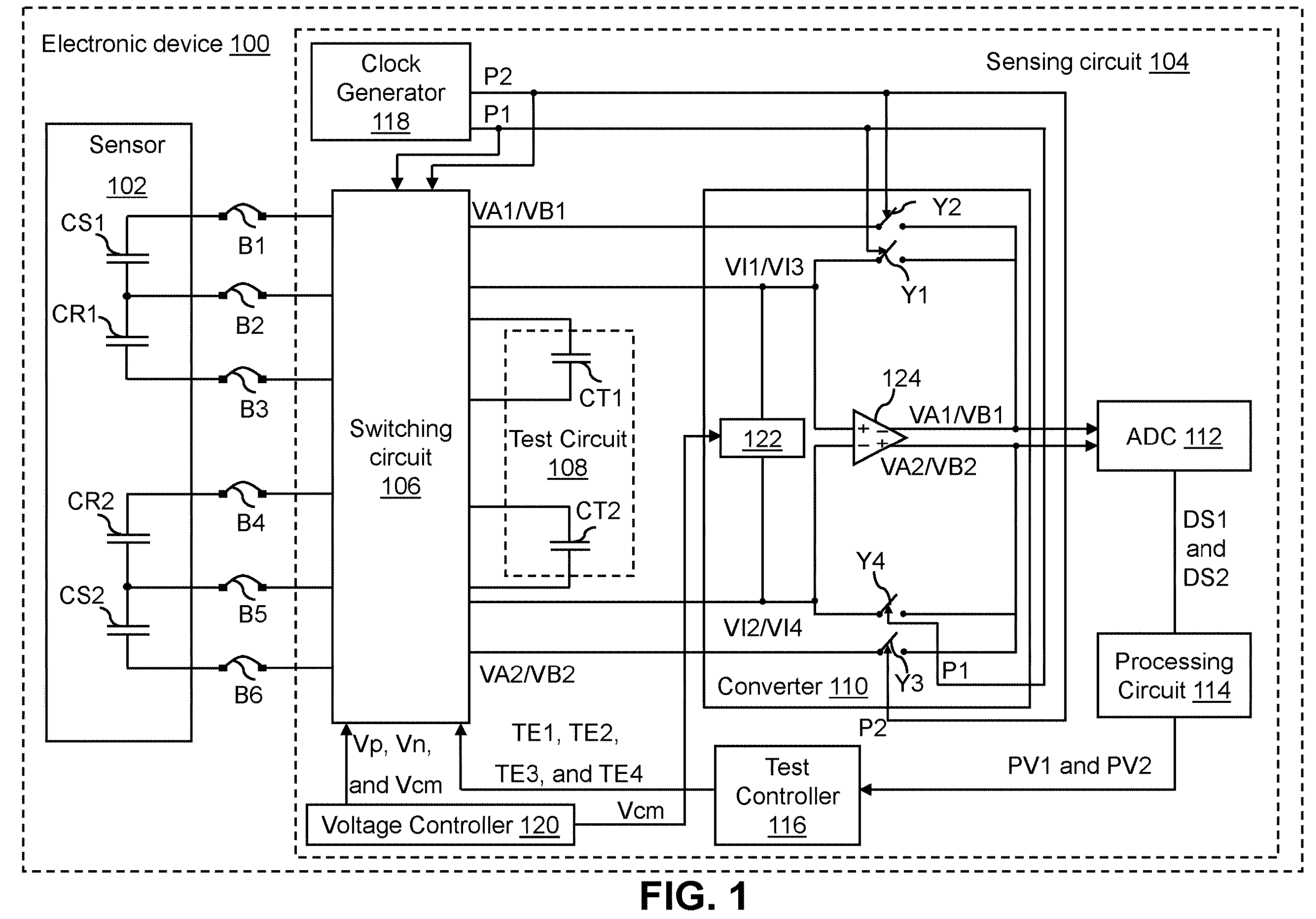
FIG. 1 is a schematic block diagram of an electronic device, in accordance with an embodiment of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview

In conventional fault detection systems, a sensor includes a plurality of sensing elements that individually sense a physical parameter and generate a plurality of output signals. Further, a sensing circuit determines a magnitude of the physical parameter being sensed by the sensor by combining the plurality of output signals. The sensing circuit determines that at least one of the plurality of sensing elements is faulty when at least one of the plurality of output signals is different compared to the other plurality of output signals. The conventional fault detection systems are thus limited to determining that the sensor is faulty without being unable to determine the faulty sensing element that is leading to a fault in the sensor. Additionally, any faults in the bond wires that connect the sensor and the sensing circuit are not traceable by conventional fault detection systems.

Various embodiments of the present disclosure disclose a sensing circuit. The sensing circuit may include a switching circuit, a test circuit, and a converter. A sensor may be coupled to the sensing circuit via one or more bond wires. The sensor may include a first sensing element and a second sensing element. During a normal mode of the sensing circuit, the switching circuit may couple the first sensing element and the second sensing element to the converter. Based on the coupling, the first sensing element and the second sensing element may provide a first differential input signal to the converter such that a first differential output signal is generated. The first differential output signal is a function of a physical quantity that is sensed by the sensor. The test circuit may include a first test element and a second test element. Further, during a fault diagnosis mode of the sensing circuit, the switching circuit may couple one of (i) the first test element and the second sensing element, and (ii) the first sensing element and the second test element to the converter. Based on the coupling, a second differential input signal may be provided to the converter such that a second differential output signal is generated.

The first differential output signal and the second differential output signal are processed to obtain a first parameter value and a second parameter value. The test controller may further compensate the second parameter value to obtain a third parameter value which may be further compared with the first parameter value to obtain a differential value. When the differential value is outside the tolerance range, the sensor may be determined to be faulty. Additionally, the test controller may retrieve a plurality of reference ranges to identify that the differential value lies in the plurality of reference ranges. Based on the identification, the test controller may detect that one or more bond wires are faulty.

The sensing circuit is capable of precisely determining the fault in one of the first sensing element and the second sensing element by selectively coupling one of the first test element and the second sensing element, and the second test element and the first sensing element. Additionally, the sensing circuit is able to determine the fault in one or more plurality of bond wires that couple the sensor to the sensing circuit by identifying whether the differential value lies in the plurality of reference ranges. Thus, the sensing circuit is able to detect a root cause of an output of the sensor being faulty which may be due to one or more faulty sensing elements or one or more faulty bond wires.

FIG. 1 is a schematic block diagram of an electronic device 100 in accordance with an embodiment of the present disclosure. The electronic device 100 may include a sensor 102 and a sensing circuit 104. The electronic device 100 may be utilized for various applications such as an automotive device or a heating, ventilation, and air conditioning (HVAC) system, or in various application areas such as a chemical or petrochemical plant, a treatment plant, or the like.

The sensing circuit 104 may be coupled to the sensor 102 by way of a plurality of bond wires B1-B6. The sensing circuit 104 and the sensor 102 are on two different Application Specific Integrated Circuits (ASICs). The sensing circuit 104 is typically implemented along with the sensor 102 in electronic devices (e.g., the electronic device 100) to process an output of the sensor 102 as well as to detect faults in the sensor 102 and the plurality of bond wires B1-B6 as explained in the foregoing description.

Sensor 102:

The sensor 102 may be exposed to an environment to sense a physical parameter. Examples of the physical parameter may include pressure, temperature, speed, humidity, proximity, magnetic field, flow rate, sound, potential of hydrogen (pH) level, acceleration, or the like. The sensor 102 may include a first sensing element CS1 and a second sensing element CS2. The sensor 102 senses the physical parameter by way of the first sensing element CS1 and the second sensing element CS2. The sensor 102 may further comprise a first reference element CR1 and a second reference element CR2 that are coupled to the first sensing element CS1 and the second sensing element CS2, respectively. An attribute of the first sensing element CS1 and an attribute of the second sensing element CS2 is a function of the physical parameter that is sensed by the sensor 102. Additionally, an attribute of the first reference element CR1 and an attribute of the second reference element CR2 are independent of the physical parameter that is sensed by the sensor 102. Therefore, based on variation in the physical parameter, the attribute of the first sensing element CS1 and the attribute of the second sensing element CS2 may vary whereas the attribute of the first reference element CR1 and the second reference element CR2 may remain constant. Examples of the attribute of the first sensing element CS1, the second sensing element CS2, the first reference element CR1, and the second reference element CR2 may include capacitance, resistance, inductance, frequency, amplitude, orientation, phase shift, optical characteristics, current, voltage, or the like. For the sake of brevity, it is assumed that the first sensing element CS1, the second sensing element CS2, the first reference element CR1, and the second reference element CR2 are capacitors, and are hereinafter referred to as a "first sensing capacitor CS1", a "second sensing capacitor CS2", a "first reference capacitor CR1", and a "second reference capacitor CR2", respectively. Further, the attribute of each of the first sensing capacitor CS1, the second sensing capacitor CS2, the first reference capacitor CR1, and the second reference capacitor CR2 is capacitance. In addition, the first sensing element CS1, the second sensing element CS2, the first reference element CR1, and the second reference element CR2 are collectively referred to as "sensing and reference elements".

In a scenario, the sensor 102 senses a physical parameter such as pressure. Thus, when the pressure changes, the capacitance of the first sensing capacitor CS1 and the capacitance of the second sensing capacitor CS2 varies, (e.g., increases or decreases). Further, the capacitance of each of the first reference capacitor CR1 and the second reference capacitor CR2 remains constant.

In an embodiment, each of the first sensing capacitor CS1 and the second sensing capacitor CS2 may include a first plate, a second plate, and a dielectric medium present therebetween. Examples of the dielectric medium may include air, ceramic, teflon, silica, or the like. The first plate may be a fixed plate and the second plate may be a movable plate such that the movable plate is attached to a diaphragm (not shown) of the sensor 102. The sensor 102 may be exposed to an environment with high pressure (e.g., in a chemical treatment plant) such that on application of pressure on the sensor 102, an external surface of the diaphragm may experience a force that may lead to the contraction of the diaphragm. Further, each movable plate may shift closer to the corresponding fixed plate such that a distance between the fixed plate and the movable plate changes thereby altering the capacitance associated with each of the first sensing capacitor CS1 and the second sensing capacitor CS2.

Plurality of Bond Wires B1-B6:

The plurality of bond wires B1-B6 are usually thin wires that couple components of the sensor 102 to components of the same integrated circuit (IC) that includes the sensor 102. The plurality of bond wires B1-B6 may include a first bond wire B1, a second bond wire B2, a third bond wire B3, a fourth bond wire B4, a fifth bond wire B5, and a sixth bond wire B6. In an example, the first bond wire B1 and the second bond wire B2 couple the first sensing capacitor CS1 to a switching circuit 106. Further, the second bond wire B2 and the third bond wire B3 couple the first reference capacitor CR1 to the switching circuit 106. The fourth bond wire B4 and the fifth bond wire B5 couple the second reference capacitor CR2 to the switching circuit 106, and the fifth bond wire B5 and the sixth bond wire B6 couple the second sensing capacitor CS2 to the switching circuit 106.

Faults Associated with the Sensor 102:

A fault associated with the sensor 102 may correspond to at least one of a bond wire fault that is associated with at least one of the plurality of bond wires B1-B6 and a sensor fault that is associated with at least one of the first sensing element CS1 and the second sensing element CS2.

Bond Wire Fault:

The bond wire fault may correspond to a crack or breakage of at least one of the plurality of bond wires B1-B6 which may uncouple the sensor 102 with the sensing circuit 104.

Sensor Fault:

The sensor 102 may turn faulty over a period of time. Faults associated with the sensor 102 may lead to complete or partial loss of sensitivity of the sensor 102. The sensor 102 is thus unable to accurately sense the pressure thereby affecting the output of the sensor 102.

The sensor fault may occur due to any abnormal behavior or failure in any of the first sensing capacitor CS1 and the second sensing capacitor CS2. The sensor fault may further occur due to a plurality of factors such as physical damage, aging, wear and tear, manufacturing defects, calibration errors, environmental contaminants, or the like in at least one of the first sensing capacitor CS1 and the second sensing capacitor CS2. In an example, the physical damage may be a crack in at least one of the first sensing capacitor CS1 and the second sensing capacitor CS2.

When the sensor 102 is operating normally (e.g., the fault is absent in the sensor 102), the capacitance of the first sensing capacitor CS1 equals the capacitance of the second sensing capacitor CS2. In an example, the capacitance of each of the first sensing capacitor CS1 and the second sensing capacitor CS2 is 5 picofarads (pF). Further, when pressure is applied on the sensor 102, the capacitance of the first sensing capacitor CS1 and the capacitance of the second sensing capacitor CS2 may vary equally, say from 5 pF to 10 pF. Alternatively, when the sensor is faulty (e.g., the fault is present in the sensor 102), the capacitance of the first sensing capacitor CS1 and the capacitance of the second sensing capacitor CS2 may vary differentially, when pressure is applied on the sensor 102. In an example, the capacitance of the first sensing capacitor CS1 may vary from 5 pF to 9 pF, and the capacitance of the second sensing capacitor CS2 may vary from 5 pF to 11 pF. Thus, the presence of fault in the sensor 102 may lead to deviation in the capacitance of at least one of the first sensing capacitor CS1 and the second sensing capacitor CS2 thereby affecting the output of the sensor 102. Similarly due to the bond wire faults, the sensing circuit 104 receives a faulty output of the sensor 102 by way of the faulty bond wires as will be understood by a person skilled in the art.

Sensing Circuit 104:

The sensing circuit 104 may include the switching circuit 106, a test circuit 108, a converter 110, an analog-to-digital converter (ADC) 112, a processing circuit 114, and a test controller 116. The sensing circuit 104 may further include a clock generator 118 and a voltage controller 120. The sensing circuit 104 may be configured to charge the first sensing capacitor CS1, the second sensing capacitor CS2, the first reference capacitor CR1, and the second reference capacitor CR2 such that a differential output signal (e.g., a first differential output signal VA1 and VA2, and a second differential output signal VB1 and VB2) is generated. Further, the sensing circuit 104 may process the differential output signal to generate a parameter value (e.g., a first parameter value PV1 and a second parameter value PV2) indicative of the physical parameter being sensed by the sensor 102.

The test circuit 108 is coupled to the switching circuit 106. The test circuit 108 may include a first test element CT1 and a second test element CT2. Examples of the first test element CT1 and the second test element CT2 may include a capacitor, a resistor, an inductor, an oscillator, or the like. In an embodiment, the first test element CT1 and the second test element CT2 may be structurally similar to the first reference capacitor CR1 and the second reference capacitor CR2. Further, an attribute of the first test element CT1 and an attribute of the second test element CT2 are independent of the physical parameter that is sensed by the sensor 102. Additionally, for the sake of brevity, it is assumed that the first test element CT1 and the second test element CT2 are capacitors, and are hereinafter referred to as a “first test capacitor CT1” and a “second test capacitor CT2”, respectively.

The switching circuit 106 may be coupled between the sensor 102 and the test circuit 108. In other words, the plurality of bond wires B1-B6 may couple the switching circuit 106 to the sensor 102. The switching circuit 106 may receive a plurality of test enable signals TE1-TE4. Based on the plurality of test enable signals TE1-TE4, the switching circuit 106 may be further configured to toggle the sensing circuit 104 between a normal mode and a fault diagnosis mode. In the normal mode, the sensing circuit 104 processes the output of the sensor 102 whereas in the fault diagnosis mode, the sensing circuit 104 diagnoses the fault in at least one of the sensor 102 and the plurality of bond wires B1-B6 as explained in the foregoing description.

The switching circuit 106 may be further configured to receive a positive excitation signal Vp, a negative excitation signal Vn, a common mode signal Vcm, and the differential output signal (e.g., the first differential output signal VA1 and VA2 and the second differential output signal VB1 and VB2). The positive excitation signal Vp, the negative excitation signal Vn, the common mode signal Vom, and the differential output signal (e.g., the first differential output signal VA1 and VA2 and the second differential output signal VB1 and VB2) are voltages and hereinafter referred to as a “positive excitation voltage Vp”, a “negative excitation voltage Vn”, a “common mode voltage Vcm”, and a “differential output voltage” (e.g., a first differential output voltage VA1 and VA2, and a second differential output voltage VB1 and VB2), respectively. The switching circuit 106 may receive the first differential output voltage VA1 and VA2 during the normal mode and the second differential output voltage VB1 and VB2 during the fault diagnosis mode. The switching circuit 106 may be further configured to receive a first reference clock signal P1 and a second reference clock signal P2. The first reference clock signal P1 and the second reference clock signal P2 may be non-overlapping clock signals such that during an active state of the first reference clock signal P1, the second reference clock signal P2 is inactive, and during an active state of the second reference clock signal P2, the first reference clock signal P1 is inactive.

The switching circuit 106 may be further configured to charge the first sensing capacitor CS1, the first reference capacitor CR1, the second sensing capacitor CS2, and the second reference capacitor CR2 based on the reception of the afore-mentioned signals such that a first differential input signal VI1 and VI2 is generated during the normal mode. Further, the switching circuit 106 may be configured to charge the first test capacitor CT1, the first reference capacitor CR1, the second sensing capacitor CS2, and the second reference capacitor CR2 based on the reception of the afore-mentioned signals such that a second differential input signal VI3 and VI4 is generated during the fault diagnosis mode. The first differential input signal VI1 and VI2 and the second differential input signal VI3 and VI4 are voltages and hereinafter referred to as a “first differential input voltage VI1 and VI2” and a “second differential input voltage VI3 and VI4”, respectively. The functioning of the switching circuit 106 is explained in detail in FIG. 2.

The converter 110 may be coupled to the switching circuit 106, the ADC 112, and the clock generator 118. In an embodiment, the converter 110 corresponds to a capacitance-to-voltage converter (CVC) 110. The converter 110 may be configured to receive the first differential input voltage VI1 and VI2 during the normal mode and the second differential input voltage VI3 and VI4 during the fault diagnosis mode. Based on the first differential input voltage VI1 and VI2 and the second differential input voltage VI3 and VI4, the converter 110 may be configured to generate the first differential output voltage VA1 and VA2 and the second differential output voltage VB1 and VB2, respectively.

The converter 110 may include a regulator 122 and a differential amplifier 124. The regulator 122 may include suitable circuitry configured to perform one or more operations. For example, during the normal mode, the regulator 122 may be coupled to the first sensing capacitor CS1 and the second sensing capacitor CS2 and configured to receive the first differential input voltage VI1 and VI2. Further, the regulator 122 may be configured to maintain a stable common-mode voltage level of the first differential input voltage VI1 and VI2 by regulating a common mode component of the first differential input voltage VI1 and VI2. In other words, the regulator 122 may ensure that an average of the sum of the first positive input voltage VI1 and the first negative input voltage VI2 equals the common mode voltage Vcm.

During the fault diagnosis mode, the regulator 122 may be coupled to one of the first test capacitor CT1 and the second sensing capacitor CS2, and the second test capacitor CT2 and the first sensing capacitor CS1, and configured to receive the second differential input voltage VI3 and VI4. Further, the regulator 122 may be configured to maintain a stable common-mode voltage level of the second differential input voltage VI3 and VI4 by regulating a common mode component of the second differential input voltage VI3 and VI4. In other words, the regulator 122 may ensure that an average of the sum of the second positive input voltage VI3 and the second negative input voltage VI4 equals the common mode voltage Vcm.

The differential amplifier 124 may be coupled to the regulator 122 and the switching circuit 106. The differential amplifier 124 may include suitable circuitry configured to perform one or more operations. For example, the differential amplifier 124 may be configured to generate the first differential output voltage VA1 and VA2 based on a common mode regulation of the first differential input voltage VI1 and VI2 during the normal mode. In other words, the differential amplifier 124 may be configured to generate the first differential output voltage VA1 and VA2 based on the capacitance of the first sensing capacitor CS1 and the capacitance of the second sensing capacitor CS2, during the normal mode as explained in the foregoing description. Additionally, the differential amplifier 124 may be configured to generate the second differential output voltage VB1 and VB2 based on a common mode regulation of the second differential input voltage VI3 and VI4 during the fault diagnosis mode. In other words, the differential amplifier 124 may be configured to generate the second differential output voltage VB1 and VB2 based on one of (i) the capacitance of the first test capacitor CT1 and the capacitance of the second sensing capacitor CS2 and (ii) the capacitance of the second test capacitor CT2 and the capacitance of the first sensing capacitor CS1, during the fault diagnosis mode as explained in the foregoing description.

The converter 110 may further include a plurality of toggle switches Y1-Y4. The plurality of toggle switches Y1-Y4 may include a first toggle switch Y1, a second toggle switch Y2, a third toggle switch Y3, and a fourth toggle switch Y4. A first terminal and a second terminal of the first toggle switch Y1 may be coupled across the differential amplifier 124, e.g., as a feedback of the differential amplifier 124 (between a negative output terminal (−) and a positive input terminal (+) of the differential amplifier 124. Further, the positive input terminal (+) of the differential amplifier 124 is coupled to the first sensing capacitor CS1, the first reference capacitor CR1, and the first test capacitor CT1 by way of the switching circuit 106. The plurality of toggle switches Y1-Y4 may be in one of a close position and an open position based on a reference clock signal (e.g., the first reference clock signal P1 and the second reference clock signal P2)

The first reference clock signal P1 controls the first toggle switch Y1 by way of a control terminal of the first toggle switch Y1 to selectively open and close the first toggle switch Y1. The charging of the first sensing capacitor CS1 during the normal mode and the charging of the first test capacitor CT1 during the fault diagnosis mode is thereby controlled such that corresponding amount of charge is stored on each of the first sensing capacitor CS1 during the normal mode and the first test capacitor CT1 during the fault diagnosis mode, respectively.

It will be understood by a person skilled in the art that the coupling of the remaining switches of the sensing circuit 104 with the respective circuitry of the sensing circuit 104 occurs by way of the corresponding terminals of the switches similar to the manner explained for the first toggle switch Y1. Thus, the coupling of the remaining switches of the sensing circuit 104 will hereinafter be explained directly with the respective circuitry of the sensing circuit 104 without explicitly mentioning the terminals of the remaining switches of the sensing circuit 104. A person skilled in the art will gather the coupling of the terminals of the remaining switches of the sensing circuit 104 with the respective circuitry of the sensing circuit 104 from the above and from the following description.

The fourth toggle switch Y4 may similarly be coupled at a feedback of the differential amplifier 124 (between a positive output terminal (+) and a negative input terminal (−) of the differential amplifier 124). Further, the negative input terminal (−) of the differential amplifier 124 is coupled to the second sensing capacitor CS2, the second reference capacitor CR2, and the second test capacitor CT2 by way of the switching circuit 106. Further, the fourth toggle switch Y4 is coupled to the second sensing capacitor CS2, the second reference capacitor CR2, and the first test capacitor CT2 by way of the switching circuit 106. The first reference clock signal P1 controls the fourth toggle switch Y4 to selectively open and close the fourth toggle switch Y4 thereby controlling the charging of the second sensing capacitor CS2 during the normal mode, and the charging of the second test capacitor CT2 during the fault diagnosis mode. Thus, a corresponding amount of charge is stored on each of the second sensing capacitor CS2 during the normal mode and the second test capacitor CT2 during the fault diagnosis mode.

The second toggle switch Y2 may be coupled at the negative output terminal (−) of the differential amplifier 124 and between the first sensing capacitor CS1 and the first test capacitor CT1 by way of the switching circuit 106. The first reference capacitor CR1 is charged when the second reference clock signal P2 is asserted. Further, the second reference clock signal P2 controls the second toggle switch Y2 to selectively open and close the second toggle switch Y2 thereby controlling charge transfer of the charge stored on the first sensing capacitor CS1 and the first reference capacitor CR1 during the normal mode, and the first test capacitor CT1 and the first reference capacitor CR1 during the fault diagnosis mode.

The third toggle switch Y3 may be coupled at the positive output terminal (+) of the differential amplifier 124 and between the second sensing capacitor CS2 and the second test capacitor CT2 by way of the switching circuit 106. The second reference capacitor CR1 is charged when the second reference clock signal P2 is asserted. Further, the second reference clock signal P2 controls the third toggle switch Y3 to selectively open and close the third toggle switch Y3 thereby controlling charge transfer of the charge stored on the second sensing capacitor CS2 and the second reference capacitor CR2 during the normal mode, and the second test capacitor CT2 and the second reference capacitor CR2 during the fault diagnosis mode.

The first differential input voltage VI1 and VI2 may be generated by controlling the charge transfer of the charge stored on the each of the first sensing capacitor CS1, the first reference capacitor CR1, the second sensing capacitor CS2, and the second reference capacitor CR2 during the normal mode. Further, the differential amplifier 124 may generate the first differential output voltage VA1 and VA2 based on the first differential input voltage VI1 and VI2. Alternatively, the second differential input voltage VI3 and VI4 may be generated by controlling the charge transfer of the charge stored on each of the first test capacitor CT1, the first reference capacitor CR1, the second sensing capacitor CS2, and the second reference capacitor CR2 during the fault diagnosis mode. Further, the differential amplifier 124 may generate the second differential output voltage VB1 and VB2 based on the second differential input voltage VI3 and VI4. The generation of the first differential output voltage VA1 and VA2 and the second differential output voltage VB1 and VB2 has been explained in detail in FIG. 2.

The ADC 112 may include suitable circuitry configured to perform one or more operations. For example, the ADC 112 may be coupled to the differential amplifier 124 of the converter 110. During the normal mode, the ADC 112 is configured to receive the first differential output voltage VA1 and VA2. The ADC 112 may be configured to generate a first digital code DS1 that may correspond to a digitized version of the first differential output voltage VA1 and VA2. Further, during the fault diagnosis mode, the ADC 112 is configured to receive the second differential output voltage VB1 and VB2 from the converter 110. The ADC 112 is further configured to generate a second digital code DS2 that may correspond to a digitized version of the second differential output voltage VB1 and VB2.

The processing circuit 114 may be coupled to the ADC 112 and the test controller 116, and include suitable circuitry configured to perform one or more operations. For example, the processing circuit 114 may be configured to receive the first digital signal DS1 during the normal mode and the second digital signal DS2 during the fault diagnosis mode. During the normal mode, the processing circuit 114 may be configured to execute one or more processing operations on the first digital code DS1 to generate the first parameter value PV1 of the physical parameter that is being sensed. In an embodiment, the physical parameter is pressure. Thus, the first parameter value PV1 indicates an amount of pressure that is sensed by the sensor 102, i.e., on the first sensing capacitor CS1 and the second sensing capacitor CS2. Thus, the first parameter value PV1 provides a measurement of the physical parameter. For example, the first parameter value PV1 is 50, thus, the pressure sensed by the sensor 102 is 50 bar.

During the fault diagnosis mode, the processing circuit 114 may be configured to execute one or more processing operations on the second digital code DS2 to generate the second parameter value PV2 of the physical parameter being sensed. In an example, when the physical parameter is pressure, the second parameter value PV2 indicates the amount of pressure that is applied on one of the first sensing capacitor CS1 and the second sensing capacitor CS2. Examples of the one or more processing operations may include at least one of a filtering operation and a trimming operation. During the filtering operation, the processing circuit 114 may be configured to enhance the quality of a digital code (e.g., the first digital code DS1 and the second digital code DS2), and/or remove unwanted noise or interference from the digital code. During the trimming operation, the processing circuit 114 may be configured to reduce the length of the digital code or discard unwanted components of the digital code. Further, the processing circuit 114 may be configured to compress size of the digital code based on the trimming operation.

In Operation:

The sensing circuit 104 operates in the normal mode based on the assertion of the first test enable signal TE1 and the second test enable signal TE2 by the test controller 116.

During the normal mode of the sensing circuit 104, hereinafter referred to as "the normal mode", the switching circuit 106 may be configured to selectively couple the first sensing capacitor CS1 and the second sensing capacitor CS2 to the converter 110 based on the assertion of the first test enable signal TE1 and the second test enable signal TE2. The switching circuit 106 may be further configured to receive the first differential output voltage VA1 and VA2. Additionally, the first reference clock signal P1 may be asserted and the switching circuit 106 may be configured to receive the asserted first reference clock signal P1.

The first reference clock signal P1 may be asserted to control the first toggle switch Y1 and the fourth toggle switch Y4 to close during the normal mode. When the first toggle switch Y1 and the fourth toggle switch Y4 are closed, the first differential output voltage VA1 and VA2 may be fed-back to the input terminal of the differential amplifier 124. The capacitance of the first sensing capacitor CS1 and the second sensing capacitor CS2 may vary based on the pressure that is applied on the sensor 102 (e.g., the pressure sensed by the sensor 102). Based on the change in the capacitance of the first sensing capacitor CS1 and the second sensing capacitor CS2 and reception of the positive excitation voltage Vp, the negative excitation voltage Vn, and the asserted first reference clock signal P1 by the switching circuit 106, the charging of the first sensing capacitor CS1 and the second sensing capacitor CS2 may be controlled during the normal mode. Additionally, the first reference capacitor CR1 and the second reference capacitor CR2 have no differential charge as the voltage across the plate of the first reference capacitor CR1 and the second reference capacitor CR2 is the same (e.g., the common mode voltage Vcm and the first differential voltage VA1 and VA2 are equal).

When the second reference clock signal P2 is asserted, the first reference clock signal P1 may be de-asserted. The asserted second reference clock signal P2 may control the second toggle switch Y2 and the third toggle switch Y3 to close such that the first differential output voltage VA1 and VA2 may be applied across the first sensing capacitor CS1 and the second sensing capacitor CS2. Further, the switching circuit 106 may be configured to receive the asserted second reference clock signal P2 such that the positive excitation voltage Vp may be applied across the first reference capacitor CR1, and the negative excitation voltage Vn may be applied across the second reference capacitor CR2. The switching circuit 106 may further receive the first differential output voltage VA1 and VA2 and the asserted second reference clock signal P2. Thus, the charging of the first sensing capacitor CS1, the second sensing capacitor CS2, the first reference capacitor CR1, and the second reference capacitor CR2 may be further controlled during the normal mode such that the first differential input voltage VI1 and VI2 is generated. The regulator 122 may be configured to maintain the stable common-mode voltage level of the first differential input voltage VI1 and V12 by regulating the common mode component of the first differential input voltage VI1 and VI2. Further, the differential amplifier 124 may generate the first differential output voltage VA1 and VA2 based on the first differential input voltage VI1 and VI2. Additionally, the ADC 112 may generate the first digital code DS1 based on the first differential output voltage VA1 and VA2. Further, the processing circuit 114 may generate the first parameter value PV1 indicative of the pressure sensed by the sensor 102 based on the first digital code DS1.

The sensing circuit 104 operates in the fault diagnosis mode based on one of (i) the asserted second test enable signal TE2 and the asserted third test enable signal TE3, and (ii) the asserted first test enable signal TE1 and the asserted fourth test enable signal TE4 by the test controller 116.

During the fault diagnosis mode of the sensing circuit 104, hereinafter referred to as "the fault diagnosis mode", the switching circuit 106 may be configured to selectively couple one of (i) the first test capacitor CT1 and the second sensing capacitor CS2, and (ii) the second test capacitor CT2 and the first sensing capacitor CS1 to the converter 110. When the second test enable signal TE2 and the third test enable signal TE3 are asserted, the first test capacitor CT1 and the second sensing capacitor CS2 may be coupled to the converter 110. Alternatively, when the first test enable signal TE1 and the fourth test enable signal TE4 are asserted, the second test capacitor CT2 and the first sensing capacitor CS1 may be coupled to the converter 110.

The asserted first reference clock signal P1 may control the first toggle switch Y1 and the fourth toggle switch Y4 to close during the fault diagnosis mode. Further, the second differential output voltage VB1 and VB2 may be fed-back to the input terminal of the differential amplifier 124.

The capacitance of one of the first sensing capacitor CS1 and the second sensing capacitor CS2 may vary based on the pressure that is applied on the sensor 102. Based on the change in the capacitance of one of the first sensing capacitor CS1 and the second sensing capacitor CS2 and the reception of the positive excitation voltage Vp, the negative excitation voltage Vn, and the asserted first reference clock signal P1 by the switching circuit 106, the charging of one of the first sensing capacitor CS1 and the second test capacitor CT2, and the first test capacitor CT1 and the second sensing capacitor CS2 may be controlled during the fault diagnosis mode. Additionally, the first reference capacitor CR1 and the second reference capacitor CR2 have no differential charge as the voltage across the plate of the first reference capacitor CR1 and the second reference capacitor CR2 is the same (e.g., the common mode voltage Vcm and the first differential voltage VA1 and VA2 are equal).

The asserted second reference clock signal P2 may control the second toggle switch Y2 and the third toggle switch Y3. The second differential output voltage VB1 and VB2 may be applied across one of the first sensing capacitor CS1 and the second test capacitor CT2, and the first test capacitor CT1 and the second sensing capacitor CS2. Further, the positive excitation voltage Vp may be applied across the first reference capacitor CR1, and the negative excitation voltage Vn may be applied across the second reference capacitor CR2. Thus, based on the reception of the positive excitation voltage Vp, the negative excitation voltage Vn, the second differential output voltage VB1 and VB2, and the asserted second reference clock signal P2 by the switching circuit 106, the charging of one of (i) the first sensing capacitor CS1 and the second test capacitor CT2, and (ii) the first test capacitor CT1 and the second sensing capacitor CS2, and the charging of the first reference capacitor CR1 and the second reference capacitor CR2 may be further controlled during the fault diagnosis mode such that the second differential input voltage VI3 and VI4 is generated. The regulator 122 may be configured to maintain the stable common-mode voltage level of the second differential input voltage VI3 and VI4 by regulating the common mode component of the second differential input voltage VI3 and VI4. Further, the differential amplifier 124 may generate the second differential output voltage VB1 and VB2 based on the second differential input voltage VI3 and VI4. Additionally, the ADC 112 may be configured to generate the second digital code DS2 based on the second differential output voltage VB1 and VB2. Further, the processing circuit 114 may be configured to generate the second parameter value PV2 that is indicative of the pressure sensed by the sensor 102.

Test Controller 116:

The test controller 116 is coupled to the switching circuit 106. The test controller 116 may include suitable circuitry configured to perform one or more operations. For example, the test controller 116 may be configured to assert the plurality of test enable signals TE1-TE4 and provide the asserted plurality of test enable signals TE1-TE4 to the switching circuit 106. Based on the assertion of the plurality of test enable signals TE1-TE4, the test controller 116 may be configured to control the sensing circuit 104 to toggle between the normal mode and the fault diagnosis mode. In an embodiment, the test controller 116 may be configured to assert at least one of the plurality of test enable signals TE1-TE4 during the startup of the electronic device 100. In another embodiment, the test controller 116 may be configured to assert at least one of the plurality of test enable signals TE1-TE4 based on a test request (not shown) received from an external circuit.

The test controller 116 may be further configured to receive the first parameter value PV1 that is derived from the first differential output voltage VA1 and VA2 and the second parameter value PV2 that is derived from the second differential output voltage VB1 and VB2. The test controller 116 may be further configured to execute a compensation operation on the second parameter value PV2 to obtain a third parameter value that is a compensated version of the second parameter value PV2. The compensation operation on the second parameter value PV2 may be performed such that the third parameter value PV3 aligns with the first parameter value PV1 when the sensor 102 is operating normally. Further, the test controller 116 may be configured to determine a differential value that is indicative of a difference between the first parameter value PV1 and the third parameter value. Based on the differential value being within a tolerance range, the test controller 116 may detect that the sensor 102 is operating normally. Additionally, based on the differential value being outside the tolerance range, the test controller 116 may be configured to detect that the sensor 102 is faulty. The test controller 116 may be further configured to detect that the first sensing capacitor CS1 is faulty when the differential value is within a first predetermined range, and the second sensing capacitor CS2 is faulty when the differential value is within a second predetermined range that is different from the first predetermined range. Further, the first predetermined value and the second predetermined value are outside the tolerance range. In an example, the tolerance range is [+0.1, −0.1], and the first predetermined range and the second predetermined range are [−0.1, −0.3] and [0.1, 0.3], respectively. When the difference between the first parameter value PV1 and the third parameter value is within the tolerance range, for example, the differential value, is between 0.1 and −0.1, the test controller 116 may determine that the sensor 102 is operating normally. When the difference between the first parameter value PV1 and the third parameter value is outside the tolerance range, for example, the differential value is −0.2, the test controller 116 may determine that the first sensing capacitor CS1 is faulty.

Figure 4:
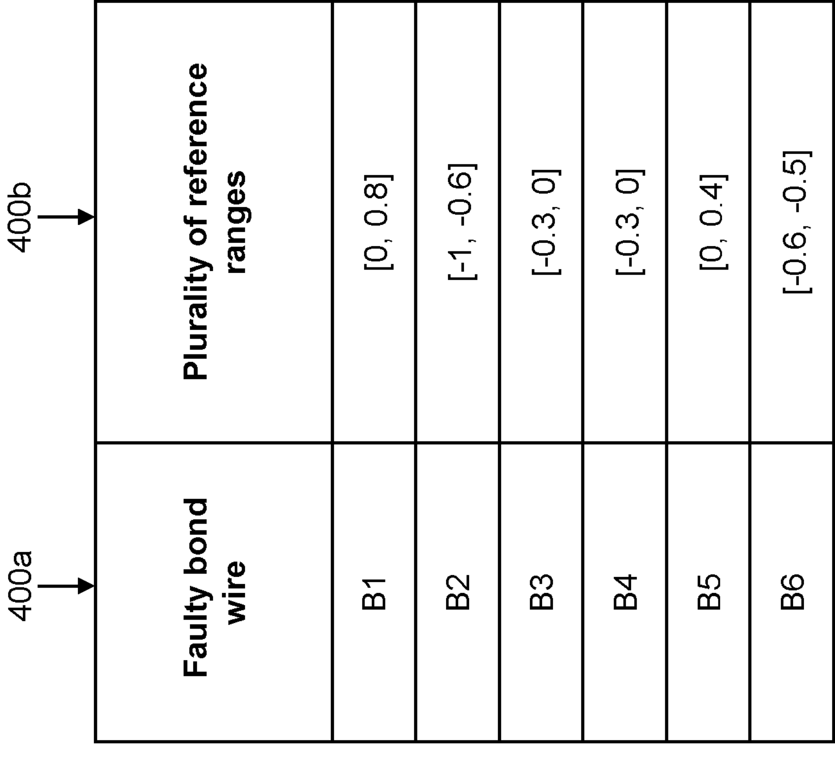
FIG. 4 is a table that illustrates a plurality of reference ranges associated with a fault in at least one bond wire of a plurality of bond wires B1-B6 that coupled the sensor and the sensing circuit of FIG. 1, in accordance with an embodiment of the present disclosure.
Figure 4:
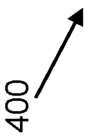

In an embodiment, the test controller 116 is configured to retrieve a plurality of reference ranges (shown in FIG. 4). Each reference range of the plurality of reference ranges may be indicative of a fault in at least one bond wire of the plurality of bond wires B1-B6. The test controller 116 may be further configured to identify that the differential value lies in the plurality of reference ranges to detect one or more bond wires that are faulty. In an embodiment, based on the determination of fault in one of the first sensing capacitor CS1, the second sensing capacitor CS2, or one of the plurality of bond wires B1-B6, the test controller 116 may generate a test control signal (not shown) to selectively decouple or disable the faulty component.

The clock generator 118 may be coupled to the switching circuit 106 and the converter 110. The clock generator 118 may include suitable circuitry configured to perform one or more operations. For example, the clock generator 118 may be configured to generate and provide the first reference clock signal P1 and the second reference clock signal P2 to the switching circuit 106 and the converter 110.

The voltage controller 120 may be coupled to the switching circuit 106. The voltage controller 120 may include suitable circuitry configured to perform one or more operations. For example, the voltage controller 120 may be configured to generate the common mode voltage Vcm, the positive excitation voltage Vp, and the negative excitation voltage Vn.

Figure 2:
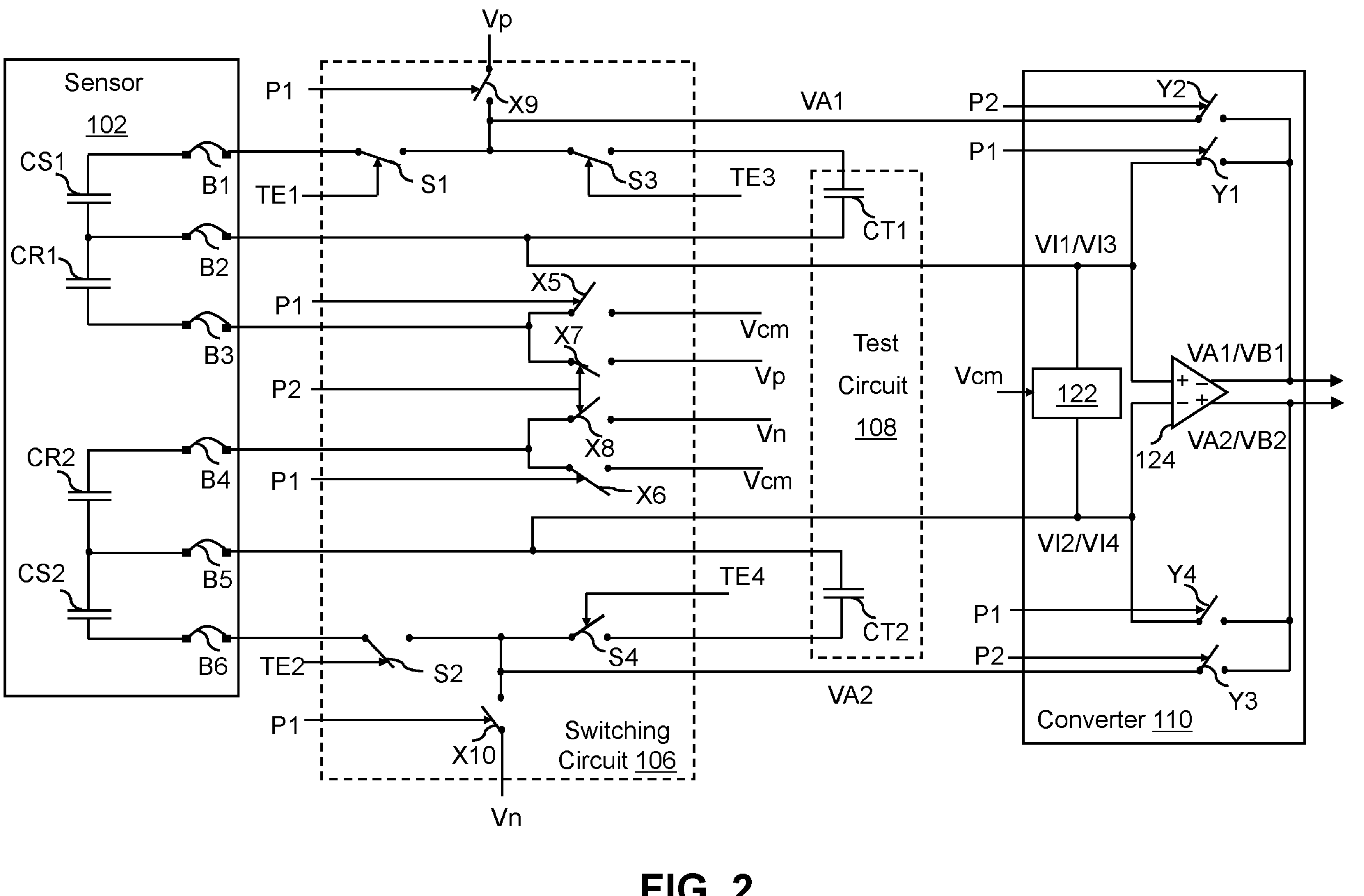
FIG. 2 is a circuit diagram that illustrates the sensor of FIG. 1, and a switching circuit, a test circuit, and a converter of the sensing circuit of FIG. 1, in accordance with an embodiment of the present disclosure.

FIG. 2 is a circuit diagram that illustrates the sensor 102, the switching circuit 106, the sensor 102, the test circuit 108, and the converter 110, in accordance with an embodiment of the present disclosure.

The switching circuit 106 may include a plurality of test enable switches S1-S4. The plurality of test enable switches S1-S4 may include a first test enable switch S1, a second test enable switch S2, a third test enable switch S3, and a fourth test enable switch S4. The switching circuit 106 may further include a plurality of toggle switches X5-X10. The plurality of toggle switches X5-X10 may include a fifth toggle switch X5, a sixth toggle switch X6, a seventh toggle switch X7, an eighth toggle switch X8, a ninth toggle switch X9, and a tenth toggle switch X10. The plurality of test enable switches S1-S4 may be in one of a close position and an open position based on the plurality of test enable signals TE1-TE4. Further, the plurality of toggle enable switches X5-X10 may be in one of a close position and an open position based on the reference clock signal (e.g., the first reference clock signal P1 and the second reference clock signal P2).

The first test enable switch S1 may be coupled to the first sensing capacitor CS1 by way of the first bond wire B1. Further, the first test enable switch S1 is coupled to the ninth toggle switch X9 and the third test enable switch S3. The first test enable signal TE1 may be asserted to selectively close the first test enable switch S1 during the normal mode thereby coupling the first sensing capacitor CS1 to one of the voltage controller 120 and the converter 110 such that the positive excitation voltage Vp and the first positive output voltage VA1 are applied across the first sensing capacitor CS1. Further, the first test enable signal TE1 may be asserted to selectively open the first test enable switch S1 during the fault diagnosis mode to decouple the first sensing capacitor CS1 from the voltage controller 120 and the converter 110.

The second test enable switch S2 may be coupled to the second sensing capacitor CS2 by way of the sixth bond wire B6. Further, the second test enable switch S2 may be coupled to the tenth toggle switch X10 and the fourth test enable switch S4. The second test enable signal TE2 may be asserted to selectively close the second test enable switch S2 during the normal mode thereby coupling the second sensing capacitor CS2 to one of the voltage controller 120 and the converter 110 such that the negative excitation voltage Vn and the first negative output voltage VA2 are applied across the second sensing capacitor CS2. Further, the second test enable signal TE2 may be de-asserted to selectively open the second test enable switch S2 during the fault diagnosis mode to uncouple the second sensing capacitor CS2 from the voltage controller 120 and the converter 110.

The third test enable switch S3 may be coupled to the first test capacitor CT1. Further, the third test enable switch S3 may be coupled to the first test enable switch S1 and the ninth toggle switch X9. The third test enable signal TE3 may be asserted to selectively close the third test enable switch S3 during the fault diagnosis mode thereby coupling the first test capacitor CT1 to one of the voltage controller 120 and the converter 110 such that one of the positive excitation voltage Vp and the second positive output voltage VB1 are applied across the first test capacitor CT1, respectively. Further, the third test enable signal TE3 may be de-asserted to selectively open the third test enable switch S3 during the normal mode to uncouple the first test capacitor CT1 from the voltage controller 120 and the converter 110.

The fourth test enable switch S4 may be coupled to the second test capacitor CT2. Further, the fourth test enable switch S4 may be coupled to the second test enable switch S2 and the tenth toggle switch X10. The fourth test enable signal TE4 may selectively close the fourth test enable switch S4 during the fault diagnosis mode thereby coupling the second test capacitor CT2 to one of the voltage controller 120 and the converter 110 such that the negative excitation voltage Vn and the second negative output voltage VB2 are applied across the second test capacitor CT2, respectively. Further, the fourth test enable signal TE4 may be de-asserted to selectively open the fourth test enable switch S4 during the normal mode to uncouple the second test capacitor CT2 from the voltage controller 120 and the converter 110.

The fifth toggle switch X5 may be coupled to the first reference capacitor CR1 by way of the third bond wire B3. Further, the fifth toggle switch X5 may be coupled to the voltage controller 120. The asserted first reference clock signal P1 may selectively close the fifth toggle switch X5 such that the common mode voltage Vom is provided to the first reference capacitor CR1 by way of the fifth toggle switch X5. Further, the de-asserted first reference clock signal P1 may selectively open the fifth toggle switch X5.

The sixth toggle switch X6 may be coupled to the second reference capacitor CR2 by way of the fourth bond wire B4. Further, the sixth toggle switch X6 may be coupled to the voltage controller 120. The asserted first reference clock signal P1 may selectively close the sixth toggle switch X6 such that the common mode voltage Vcm is provided to the second reference capacitor CR2 by way of the sixth toggle switch X6. Further, the de-asserted first reference clock signal P1 may selectively open the sixth toggle switch X6.

The seventh toggle switch X7 may be coupled to the first reference capacitor CR1 by way of the third bond wire B3. Further, the seventh toggle switch X7 may be coupled to the voltage controller 120. The second reference clock signal P2 may selectively close the seventh toggle switch X7 such that the positive excitation voltage Vp is provided to the first reference capacitor CR1 by way of the seventh toggle switch X7. Further, the second reference clock signal P2 may selectively open the seventh toggle switch X7.

The eighth toggle switch X8 may be coupled to the second reference capacitor CR2 by way of the fourth bond wire B4.

Further, the eighth toggle switch X8 may be coupled to the voltage controller 120. The second reference clock signal P2 may selectively close the eighth toggle switch X8 such that the negative excitation voltage Vn is applied across the second reference capacitor CR2 by way of the eighth toggle switch X8. Further, the second reference clock signal P2 may selectively open the eighth toggle switch X8.

The ninth toggle switch X9 may be coupled to the first test enable switch S1, the third test enable switch S3, and the second toggle switch Y2 of the converter 110. Further, the ninth toggle switch X9 may be coupled to the voltage controller 120. The asserted first reference clock signal P1 may selectively close the ninth toggle switch X9 such that the positive excitation voltage Vp is applied across the first sensing capacitor CS1 by way of the ninth toggle switch X9. Further, the de-asserted first reference clock signal P1 may selectively open the ninth toggle switch X9. When the first reference clock signal P1 is de-asserted, the second reference clock signal P2 is asserted. Additionally, the asserted second reference clock signal P2 may control the second toggle switch Y2 to selectively close the second toggle switch Y2 such that one of the first positive output voltage VA1 (during the normal mode) and the second positive output voltage VB1 (during the fault diagnosis mode) is applied across the first sensing capacitor CS1.

The tenth toggle switch X10 may be coupled to the second test enable switch S2, the fourth test enable switch S4, and the third toggle switch Y3 of the converter 110. Further, the tenth toggle switch X10 may be coupled to the voltage controller 120. The asserted first reference clock signal P1 may selectively close the tenth toggle switch X10 such that the negative excitation voltage Vn is applied across the second sensing capacitor CS2 by way of the tenth toggle switch X10. Further, the de-asserted first reference clock signal P1 may selectively open the tenth toggle switch X10. Additionally, the asserted second reference clock signal P2 may control the third toggle switch Y3 to selectively close the third toggle switch Y3 such that the first negative output voltage VA2 (during the normal mode) and the second negative output voltage VB2 (during the fault diagnosis mode) is applied across the second sensing capacitor CS2. Since the first reference clock signal P1 and the second reference clock signal P2 are non-overlapping, when the second reference clock signal P2 is asserted, the first reference clock signal P1 is de-asserted Normal Mode:

During the normal mode, the first test enable switch S1 and the second test enable switch S2 may be closed based on the asserted first test enable signal TE1 and the asserted second test enable signal TE2, respectively. Further, the third test enable switch S3 and the fourth test enable switch S4 may be open based on the de-asserted third test enable signal S3 and the de-asserted fourth test enable signal TE4. Thus, the first test enable switch S1 may be closed such that the first sensing capacitor CS1 may be coupled to the converter 110. Further, the second test enable switch S2 may be closed such that the second sensing capacitor CS2 may be coupled to the converter 110. During a first phase of the normal mode, the first reference clock signal P1 is asserted and the second reference clock signal P2 is de-asserted. Further, the fifth toggle switch X5, the sixth toggle switch X6, the ninth toggle switch X9, the tenth toggle switch X10, the first toggle switch Y1, and the fourth toggle switch Y4 may be selectively closed by way of the asserted first reference clock signal P1. Additionally, the capacitance of the first sensing capacitor CS1 and the second sensing capacitor CS2 may vary based on the pressure sensed by the sensor 102. Further, based on the change in the capacitance of the first sensing capacitor CS1 and the second sensing capacitor CS2, and the application of the positive excitation voltage Vp to the first sensing capacitor CS1, and the negative excitation voltage Vn to the second sensing capacitor CS2, the charge stored on the first sensing capacitor CS1 and the second sensing capacitor CS2 may vary. Thus, the charging of the first sensing capacitor CS1 is selectively controlled based on the positive excitation voltage Vp. Similarly, the charging of the second sensing capacitor CS2 is selectively controlled during the normal mode based on the negative excitation voltage Vn.

Alternatively, during a second phase of the normal mode, the second reference clock signal P2 is asserted and the first reference clock signal P1 is de-asserted. Further, the seventh toggle switch X7, the eighth toggle switch X8, the second toggle switch Y2, and the third toggle switch Y3 may be selectively closed by way of the second reference clock signal P2. Thus, the charging of the first sensing capacitor CS1 and the second sensing capacitor CS2 is selectively controlled based on the first differential output voltage VA1 and VA2. Further, the charging of the first reference capacitor CR1 and the second reference capacitor CR2 is selectively controlled based on the positive excitation voltage Vp and the negative excitation voltage Vn, respectively. Based on the charging of the first sensing capacitor CS1, the second sensing capacitor CS2, the first reference capacitor CR1, and the second reference capacitor CR2, the first differential input voltage VI1 and VI2 may be generated. Further, the differential amplifier 124 may generate the first differential output voltage VA1 and VA2 based on the first differential input voltage VI1 and VI2.

Fault Diagnosis Mode:

During the fault diagnosis mode, the second test enable switch S2 and the third test enable switch S3 may be closed based on the asserted second test enable signal TE2 and the asserted third test enable signal TE3, respectively. Further, the first test enable switch S1 and the fourth test enable switch S4 may be open based on the de-asserted first test enable signal TE1 and the de-asserted fourth test enable signal TE4, respectively. Thus, the second test enable switch S2 may be closed such that the second sensing capacitor CS2 may be coupled to the converter 110. Further, the third test enable switch S3 may be closed such that the first test capacitor CT1 may be coupled to the converter 110. During a first phase of the fault diagnosis mode, the first reference clock signal P1 is asserted and the second reference clock signal P2 is de-asserted. Further, the fifth toggle switch X5, the sixth toggle switch X6, the ninth toggle switch X9, the tenth toggle switch X10, the first toggle switch Y1, and the fourth toggle switch Y4 may be selectively closed by way of the first reference clock signal P1.

The capacitance of the first test capacitor CT1 may be fixed. Further, based on the application of the positive excitation voltage Vp, the first test capacitor CT1 may be charged. Additionally, the capacitance of the second sensing capacitor CS2 may vary according to the pressure sensed by the sensor 102. Further, based on the change in the capacitance and the application of the negative excitation voltage Vn to the second sensing capacitor CS2, the charge stored on the second sensing capacitor CS2 may vary. Thus, the charging of the first test capacitor CT1 is selectively controlled based on the positive excitation voltage Vp. Similarly, the charging of the second sensing capacitor CS2 is selectively controlled based on the negative excitation voltage Vn.

Alternatively, during a second phase of the fault diagnosis mode, the second reference clock signal P2 is asserted and the first reference clock signal P1 is de-asserted. Further, the seventh toggle switch X7, the eighth toggle switch X8, the second toggle switch Y2, and the third toggle switch Y3 may be selectively closed by way of the second reference clock signal P2. Thus, the charging of each of the first test capacitor CT1 and the second sensing capacitor CS2 is selectively controlled based on the second differential output voltage VB1 and VB2. Further, the charging of each of the first reference capacitor CR1 and the second reference capacitor CR2 is selectively controlled based on the positive excitation voltage Vp and the negative excitation voltage Vn, respectively. Based on the charging of the first sensing capacitor CS1, the second sensing capacitor CS2, the first reference capacitor CR1, and the second reference capacitor CR2, the second differential input voltage VI3 and VI4 may be generated. Further, the differential amplifier 124 may generate the second differential output voltage VB1 and VB2 based on the second differential input voltage VI3 and VI4.

FIGS. 3A-3D are first through fourth circuit diagrams 300A-300D that illustrate the selective coupling between the sensor 102 and the sensing circuit 104 during each of the first phase of the normal mode, the second phase of the normal mode, the first phase of the fault diagnosis mode, and the second phase of the fault diagnosis mode, respectively, in accordance with an embodiment of the present disclosure.

Figure 3A:
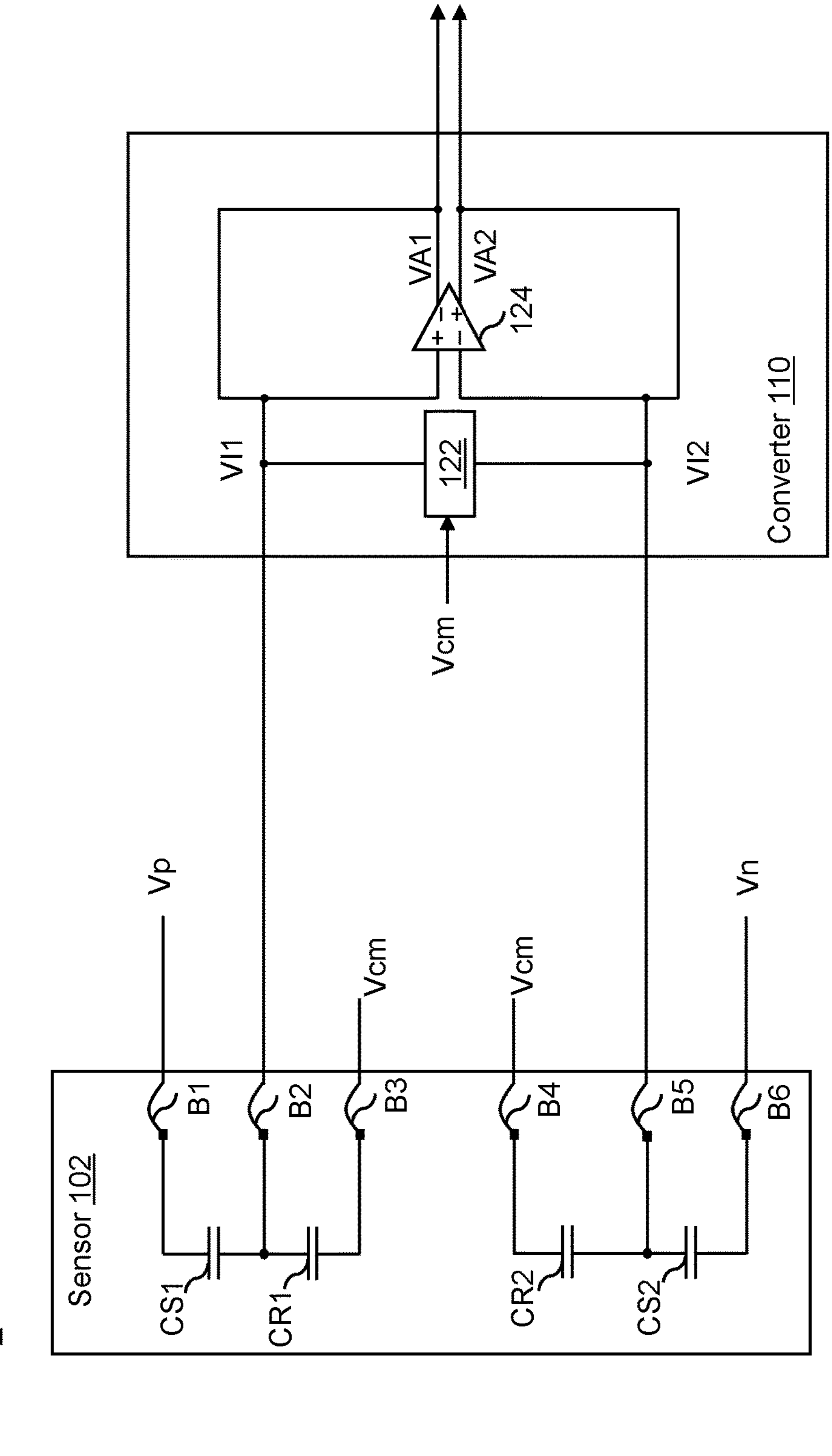
FIGS. 3A-3D are first through fourth circuit diagrams that illustrate selective coupling between the sensor and the sensing circuit of FIG. 1 during each of a first phase of a normal mode of the sensing circuit of FIG. 1, a second phase of the normal mode, a first phase of a fault diagnosis mode of the sensing circuit of FIG. 1, and a second phase of the fault diagnosis mode, respectively, in accordance with an embodiment of the present disclosure.

FIG. 3A represents the first circuit diagram 300A that illustrates the coupling between the sensor 102 and the sensing circuit 104 during the first phase of the normal mode (e.g., when the first reference clock signal P1 is asserted), in accordance with an embodiment of the present disclosure.

The capacitance of the first sensing capacitor CS1 and the second sensing capacitor CS2 may vary based on the pressure sensed by the sensor 102. As the capacitance of each of the first sensing capacitor CS1 and the second sensing capacitor CS2 varies, the charge stored on each of the first sensing capacitor CS1 and the second sensing capacitor CS2 may vary due to the positive excitation voltage Vp and the negative excitation voltage Vn, respectively. Additionally, during the first phase of the normal mode, the first differential voltage VA1 and VA2 may be equal to the common mode voltage Vcm such that the voltage across the first reference capacitor CR1 and the second reference capacitor CR2 is the same. Therefore, the first reference capacitor CR1 and the second reference capacitor CR2 remain uncharged (e.g., the first reference capacitor CR1 and the second reference capacitor CR2 have no charge).

Figure 3B:
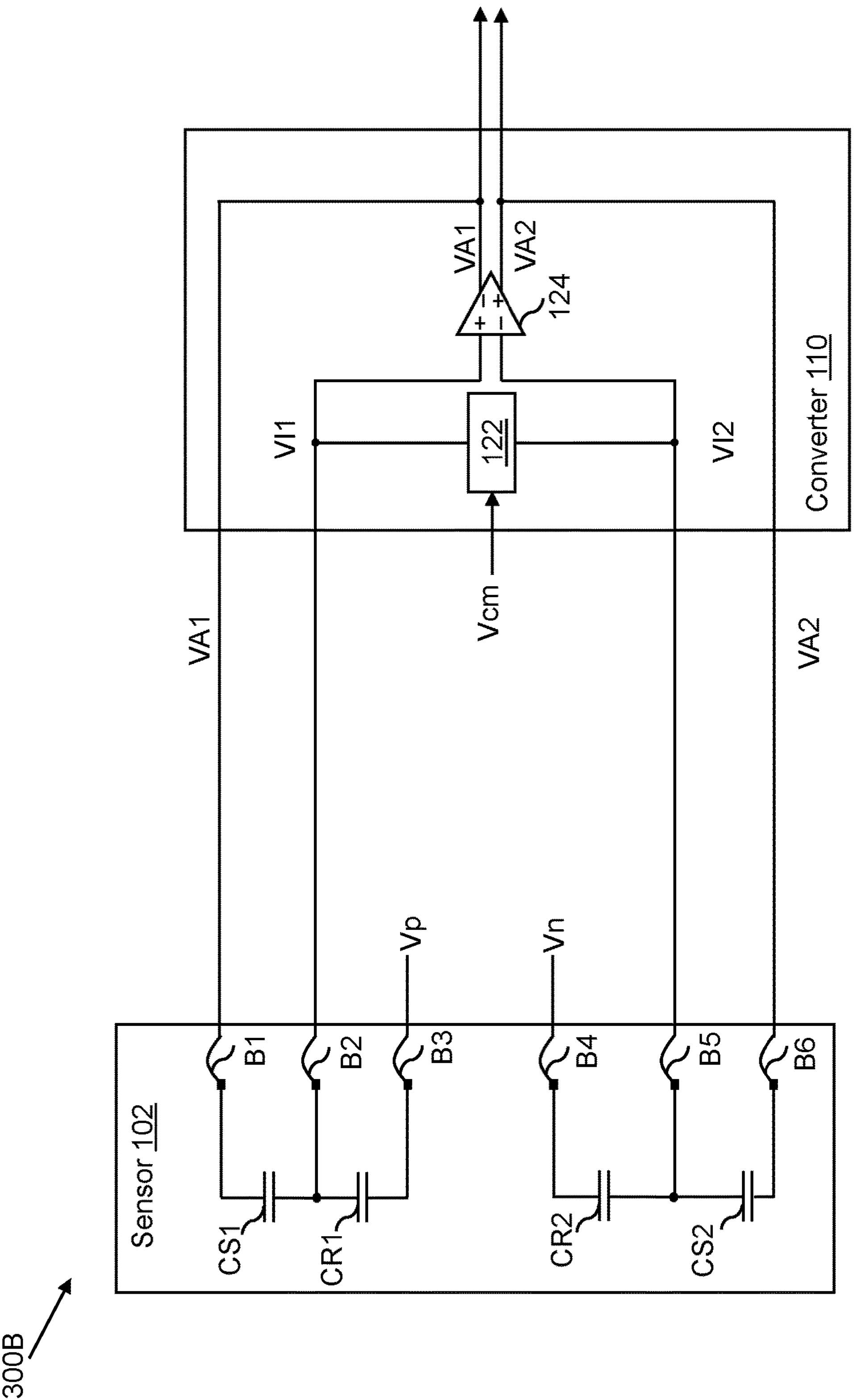

FIG. 3B represents the second circuit diagram 300B that illustrates the coupling between the sensor 102 and the sensing circuit 104 during the second phase of the normal mode, i.e., during the active state of the second reference clock signal P2 in the normal mode, in accordance with an embodiment of the present disclosure.

Initially, the first positive output voltage VA1 may be provided to the first sensing element CS1, and the first negative output voltage VA2 may be provided to the second sensing element CS2. The charging of the first sensing capacitor CS1 may be controlled based on the first positive output voltage VA1. Further, the charging of the first reference capacitor CR1 may be controlled based on the positive excitation voltage Vp. Additionally, the charging of the second sensing capacitor CS2 may be controlled based on the first negative output voltage VA2. Further, the charging of the second reference capacitor CR2 may be controlled based on the negative excitation voltage Vn. Further, based on the charge on the first sensing capacitor CS1, the second sensing capacitor CS2, the first reference capacitor CR1, and the second reference capacitor CR2, the first differential input voltage VI1 and VI2 is generated. Further, based on the common mode regulation of the first differential input voltage VI1 and VI2, the differential amplifier 124 may output the first differential output voltage VA1 and VA2, that is the first positive output voltage VA1 and the first negative output voltage VA2.

First Transfer Function:

During the first phase of the normal mode, due to the large gain of the differential amplifier 124, it is assumed that the first positive input voltage VI1 and the first negative input voltage VI2 are equal to a common mode differential input voltage Vlcm. Similarly, the first positive output voltage VA1 and the first negative output voltage VA2 are equal to a common mode differential output voltage VAcm. Further, the differential amplifier 124 is assumed to be in a unity gain such that the common mode differential input voltage Vicm (not shown) is equal to the common mode differential output voltage VAcm represented by a first equation (1):

$$VI1 = VI2 = VIcm = VAcm = VA1 = VA2 \quad (1)$$

During the first phase of the normal mode, the feedback of the differential amplifier 124 may generate a first charge Qp1 on the input terminals of the differential amplifier 124. The first charge Qp1 may be given by a second equation (2):

$$Qp1 = (VAcm - Vp) \times CCS1 - (VAcm - Vn) \times CCS2 \quad (2)$$

where, CCS1 and CCS2 represent the capacitance of the first sensing capacitor CS1 and the second sensing capacitor CS2, respectively.

During the second phase of the normal mode, the first positive input voltage VI1 and the first negative input voltage VI2 are assumed to be equal to the common mode differential input voltage VIcm represented by a third equation (3):

$$VI1 = VI2 = Vicm \quad (3)$$

During the second phase of the normal mode, a second charge Qp2 on the input terminal of the differential amplifier 124 may be given by a fourth equation (4):

$$Qp2 = ((VI1 - VA1) \times CCS1 + (VI1 - Vp) \times CCR1) - ((VI2 - \mathrm{VA2}) \times CCS2 + (VI2 - Vn) \times CCR2) \quad (4)$$

where CCR1 and CCR2 represent the capacitance of the first reference capacitor CR1 and the second reference capacitor CR2, respectively.

Further, the first positive output voltage VA1, the first negative output voltage VA2, the positive excitation voltage Vp, and the negative excitation voltage Vn may include a common mode component and a differential component AVA represented by a set of fifth equations (5):

$$VA1 = VAcm + \Delta VA;\ VA2 = VAcm - \Delta VA;\ Vp = Vcm + \Delta V;\ Vn = Vcm - \Delta V; \tag{5}$$

where the VAcm is a common mode component of the first differential voltage VA1 and VA2 and the Vcm is a common mode component of the positive excitation voltage Vp and the negative excitation voltage Vn. Further, the ΔVA is a differential component of the first differential voltage VA1 and VA2 and the ΔV is a differential component of the positive excitation voltage Vp and the negative excitation voltage Vn.

Based on charge conservation, the first charge Qp1 is equal to the second charge Qp2. Therefore, upon equating the second equation (2) and the fourth equation (4), a sixth equation (6) is obtained:

$$(VAcm + \Delta VA) \times CCS1 - (VAcm - \Delta VA) \times CCS2 = VIcm \times (CCS1 - CCS2 + CCR1 - CCR2) + (Vcm + \Delta V) \times (CCS1 - CCR1) - (Vcm - \Delta V) \times (CCS2 - CCR2) - VAcm \times (CCS1 - CCR2)) \tag{6}$$

Upon further solving the sixth equation (6), a seventh equation (7) is obtained:

$$\Delta VA \times (CCS1 + CCS2) = VIcm(CCS1 - CCS2 + CCR1 - CCR2) + Vcm \times (CCS1 - CCS2 - (CCR1 - CCR2)) + \Delta V \times ((CCS1 + CCS2) - (CCR1 - CCR2)) - VAcm \times (CCS1 - CCS2) \tag{7}$$

Now a first capacitance difference ΔCS is defined as a difference between a capacitance of the first sensing capacitor CCS1 and a capacitance of the second sensing capacitor CCS2 represented by an eighth equation (8):

$$\Delta CS = CCS1 - CCS2 \tag{8}$$

Further, a second capacitance difference ΔCR is defined as a difference between a capacitance of the first reference capacitor CCR1 and a capacitance of the second reference capacitor CCR2 represented by a ninth equation (9):

$$\Delta CR = CCR1 - CCR2 \tag{9}$$

Upon substituting the first capacitance difference ΔCS and the second capacitance difference ΔCR in the seventh equation (7), a tenth equation (10) is obtained:

$$\Delta VA = VIcm\left[\frac{\Delta CS + \Delta CR}{CCS1 + CCS2}\right] + Vcm\left[\frac{\Delta CS - \Delta CR}{CCS1 + CCS2}\right] + \Delta V\left[1 - \frac{CCR1 + CCR2}{CCS1 + CCS2}\right] + VAcm\left[\frac{\Delta CS}{CCS1 + CCS2}\right] \tag{10}$$

As VA1−VA2=2ΔVA and Vp−Vn=2ΔV, upon substituting in the tenth equation (10), an eleventh equation (11) is obtained:

$$VA1 - VA2 = 2 \times VIcm\left[\frac{\Delta CS + \Delta CR}{CCS1 + CCS2}\right] + 2 \times Vcm\left[\frac{\Delta CS - \Delta CR}{CCS1 + CCS2}\right] + (Vp - Vn)\left[1 - \frac{CCR1 + CCR2}{CCS1 + CCS2}\right] + 2 \times VAcm\left[\frac{\Delta CS}{CCS1 + CCS2}\right] \tag{11}$$

When ΔCS and ΔCR are negligible, we obtain a twelfth equation (12):

$$VA1 - VA2 = (Vp - Vn)\left[1 - \frac{CCR1 + CCR2}{CCS1 + CCS2}\right] \tag{12}$$

Therefore, the first differential output voltage VA1 and VA2 is obtained.

Figure 3C:
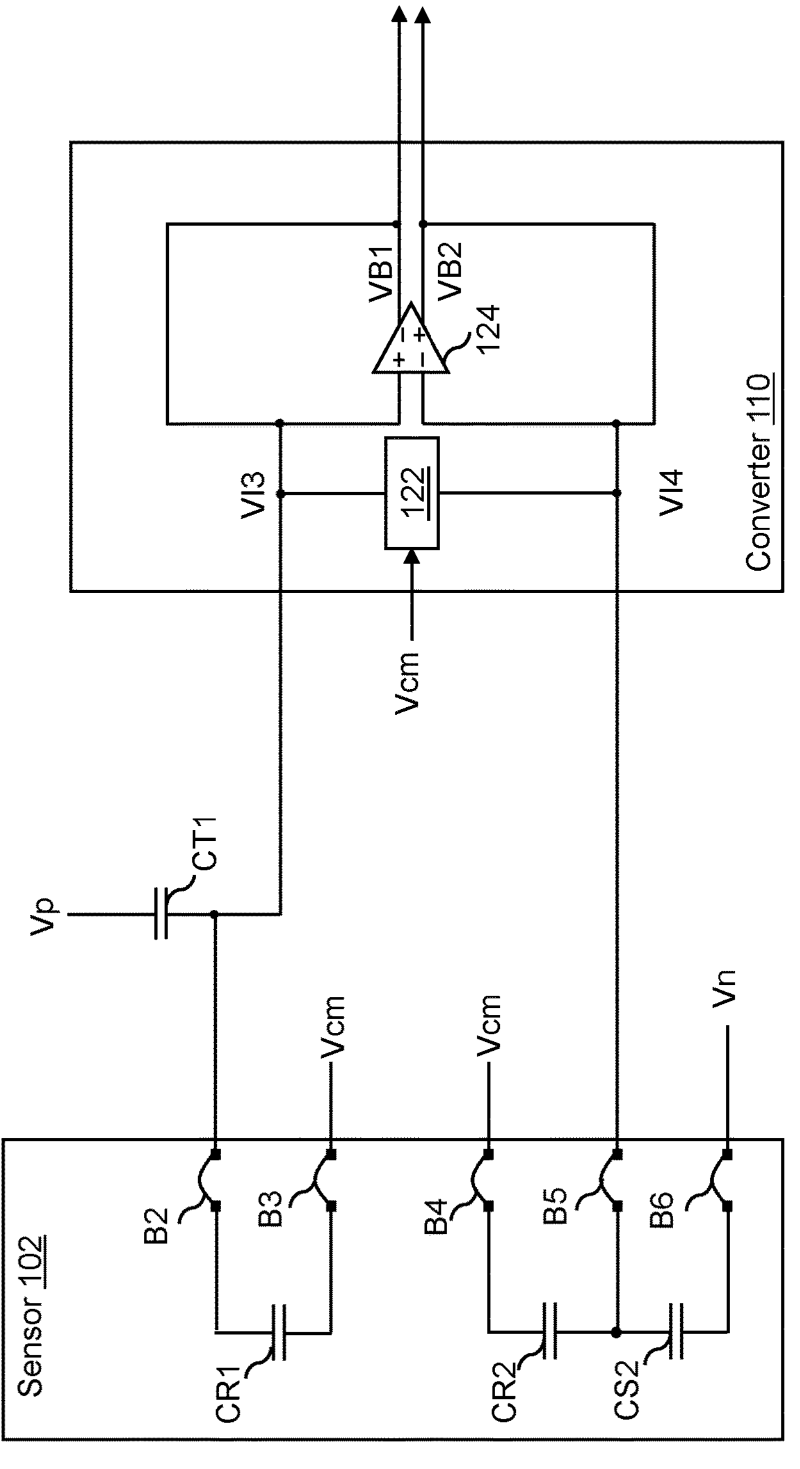
Figure 3C:

FIG. 3C represents the third circuit diagram 300C that illustrates the coupling between the sensor 102 and the sensing circuit 104 during the first phase of the fault diagnosis mode (e.g., when the first reference clock signal P1 is asserted) in accordance with an embodiment of the present disclosure.

The capacitance of the second sensing capacitor CS2 may vary based on the pressure sensed by the sensor 102. As the capacitance of the second sensing capacitor CS2 varies, the charge stored on the second sensing capacitor CS2 may vary due to the negative excitation voltage Vn. Further, the charging of the first test capacitor CT1 may be controlled based on the positive excitation voltage Vp. Additionally, during the first phase of the fault diagnosis mode, the second differential voltage VB1 and VB2 may be equal to the common mode voltage Vcm such that the voltage across the first reference capacitor CR1 and the second reference capacitor CR2 is the same. Therefore, the first reference capacitor CR1 and the second reference capacitor CR2 remain uncharged (e.g., the first reference capacitor CR1 and the second reference capacitor CR2 have no charge).

Figure 3D:
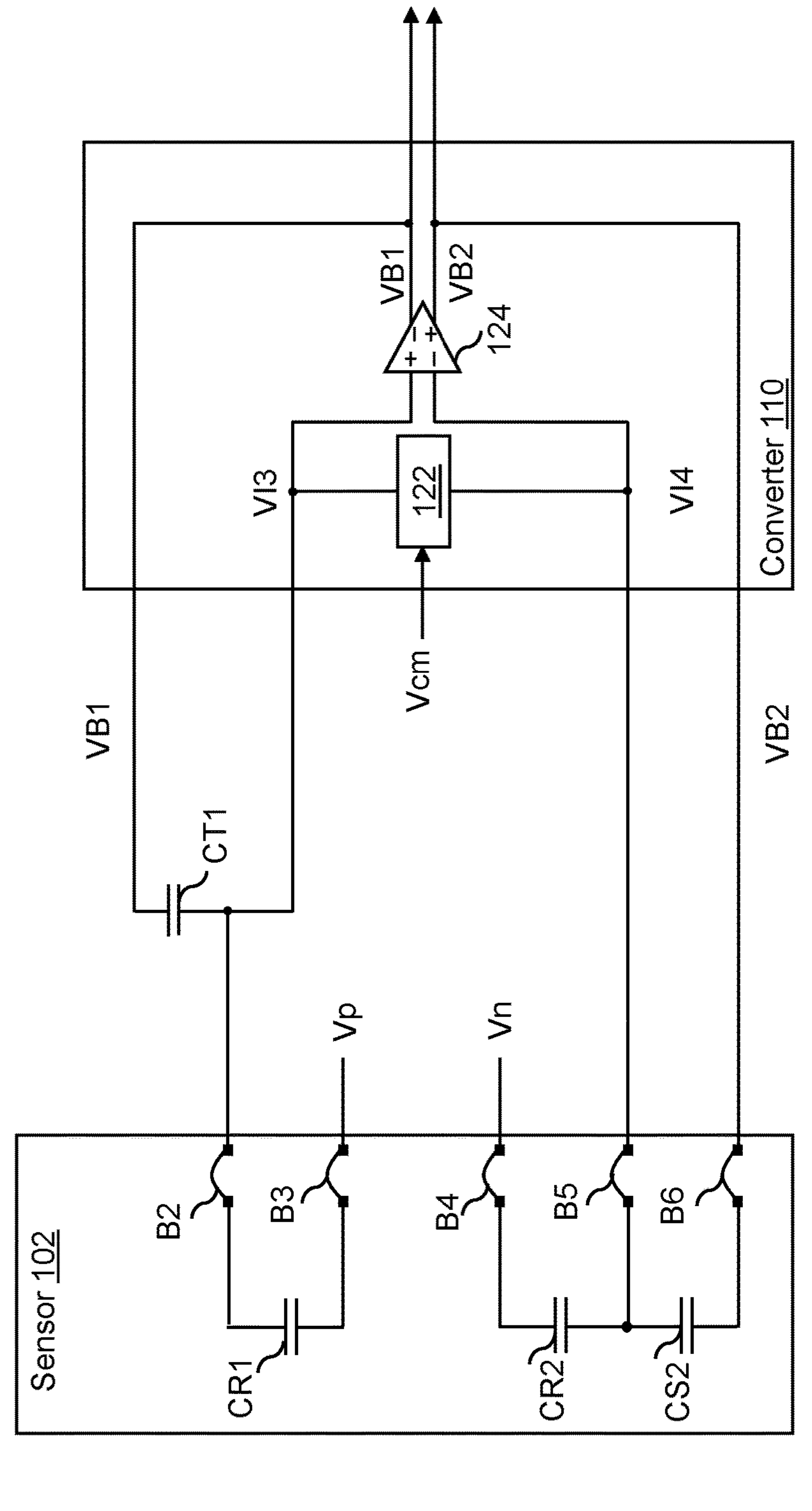

FIG. 3D represents the fourth circuit diagram 300D that illustrates the coupling between the sensor 102 and the sensing circuit 104 during the second phase of the fault diagnosis mode, for example, during the active state of the second reference clock signal P2 in the fault diagnosis mode, in accordance with an embodiment of the present disclosure.

Initially, the second positive output voltage VB1 may be provided to the first test capacitor CT1, and the second negative output voltage VB2 may be provided to the second sensing capacitor CS2. The charging of the first test capacitor CT1 may be controlled based on the first positive output voltage VB1. Further, the charging of the first reference capacitor CR1 may be controlled based on the positive excitation voltage Vp. Additionally, the charging of the second sensing capacitor CS2 may be controlled based on the second negative output voltage VB2. Further, the charging of the second reference capacitor CR2 may be controlled based on the negative excitation voltage Vn. Further, based on the charge on each of the first test capacitor CT1, the second sensing capacitor CS2, the first reference capacitor CR1, and the second reference capacitor CR2, the second differential input voltage VI3 and VI4 is generated. Further, based on the common mode regulation of the first differential input voltage VI1 and VI2, the differential amplifier 124 may output the second differential output voltage VB1 and VB2, that is the second positive output voltage VB1 and the second negative output voltage VB2.

Second Transfer Function:

In the present embodiment of the fault diagnosis mode, one of the sensing capacitors (e.g., the first sensing capacitor CS1) is replaced by the first test capacitor CT1 in the twelfth equation (12) to obtain a thirteenth equation (13):

$$VB1 - VB2 = (Vp - Vn)\left[1 - \frac{CCR1 + CCR2}{CCT1 + CCS2}\right] \quad (13)$$

where, CCT1 represents the capacitance of the first test capacitor CT1.

Therefore, the second differential output voltage (e.g., VB1 and VB2) is obtained.

FIG. 4 is a table 400 that illustrates the plurality of reference ranges associated with the fault in at least one bond wire of the plurality of bond wires B1-B6 that coupled the sensor 102 and the sensing circuit 104, in accordance with an embodiment of the present disclosure.

The table 400 includes a first column 400*a* and a second column 400*b*. The first column 400*a* indicates a faulty bond wire of any of the plurality of bond wires B1-B6. The second column 400*b* may correspond to the plurality of reference ranges. Each reference range may be indicative of the fault in at least one bond wire of the plurality of bond wires B1-B6. In an embodiment, the second column 400*b* includes the plurality of reference ranges of normalized pressure difference. Thus, a first reference range of the plurality of reference ranges indicates a fault in the first bond wire B1. Similarly, each reference range of the remaining plurality of reference ranges indicate a fault in the corresponding bond wire of the remaining plurality of bond wires B2-B6 as described by way of the examples below. The plurality of reference ranges may be determined by experimentation, simulations, analytical methods (e.g., theoretical calculations), data analysis, or the like.

In an example, the differential value is −0.2. As the differential value of −0.2 lies in a third reference range [0, −0.3] of the plurality of reference ranges and a fourth reference range [0, −0.3] of the plurality of reference ranges, thus the test controller 116 identifies that at least one of the third bond wire B3, and the fourth bond wire B4 are faulty. In another example, the test controller 116 may determine the differential value as 0.2. Thus, the test controller 116 identifies that the differential value of 0.2 is present in the first range [0, 0.8] and a fifth range [0, 0.4] of the plurality of reference ranges, and may detect that at least one of the first bond wire B1 and the fifth bond wire B5 are faulty of the plurality of reference ranges. In yet another example, the differential value is −0.6. Thus, the test controller 116 may detect that at least one of the second bond wire B2 and the sixth bond wire B6 are faulty as the differential value of −0.2 lies in the second reference range [−1, −0.6] of the plurality of reference ranges and the sixth references range [−0.6, −0.5] of the plurality of reference ranges.

Figure 5A:
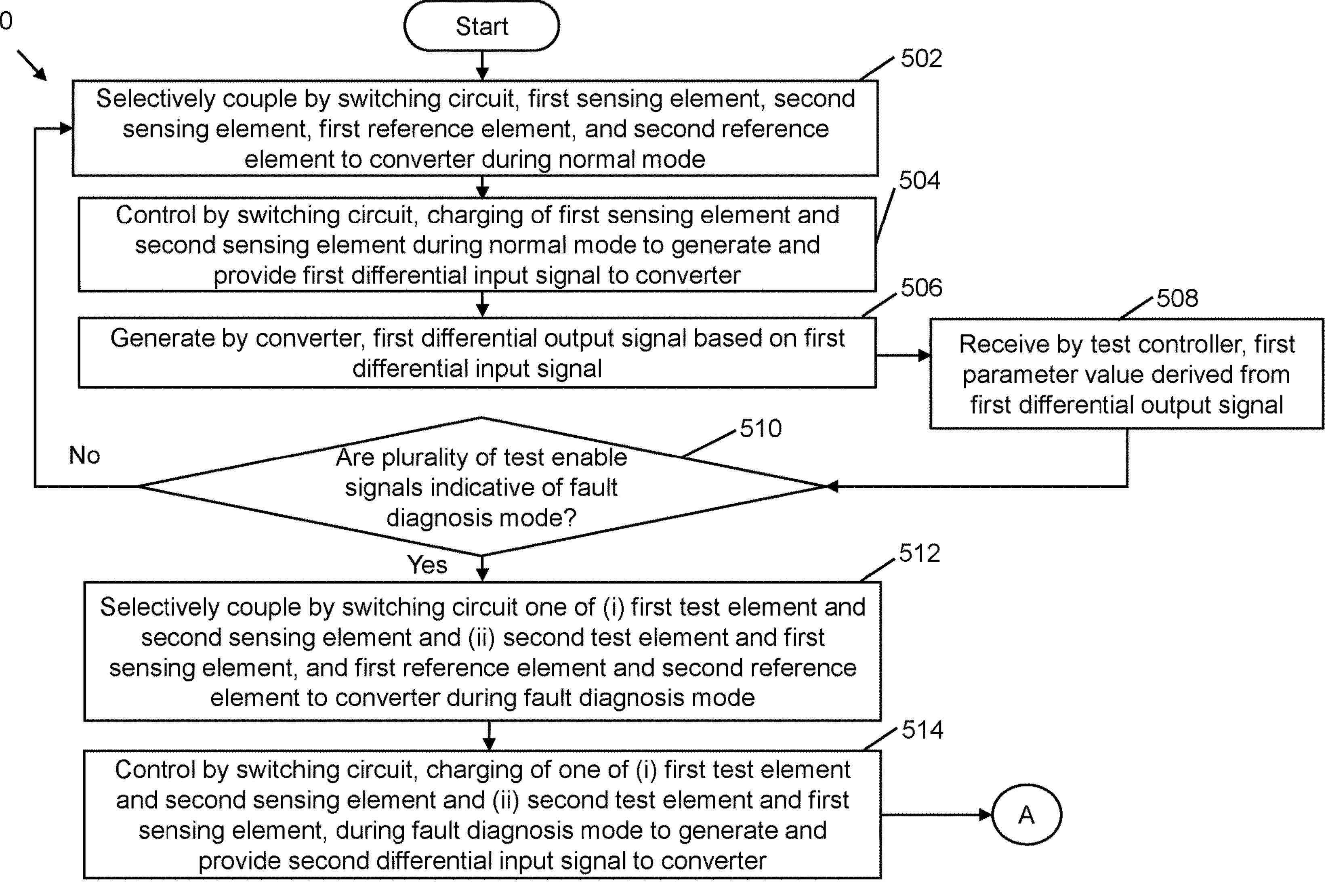
FIGS. 5A-5B, collectively, represent a flowchart that illustrates a method for fault detection, in accordance with an embodiment of the present disclosure.
Figure 5B:
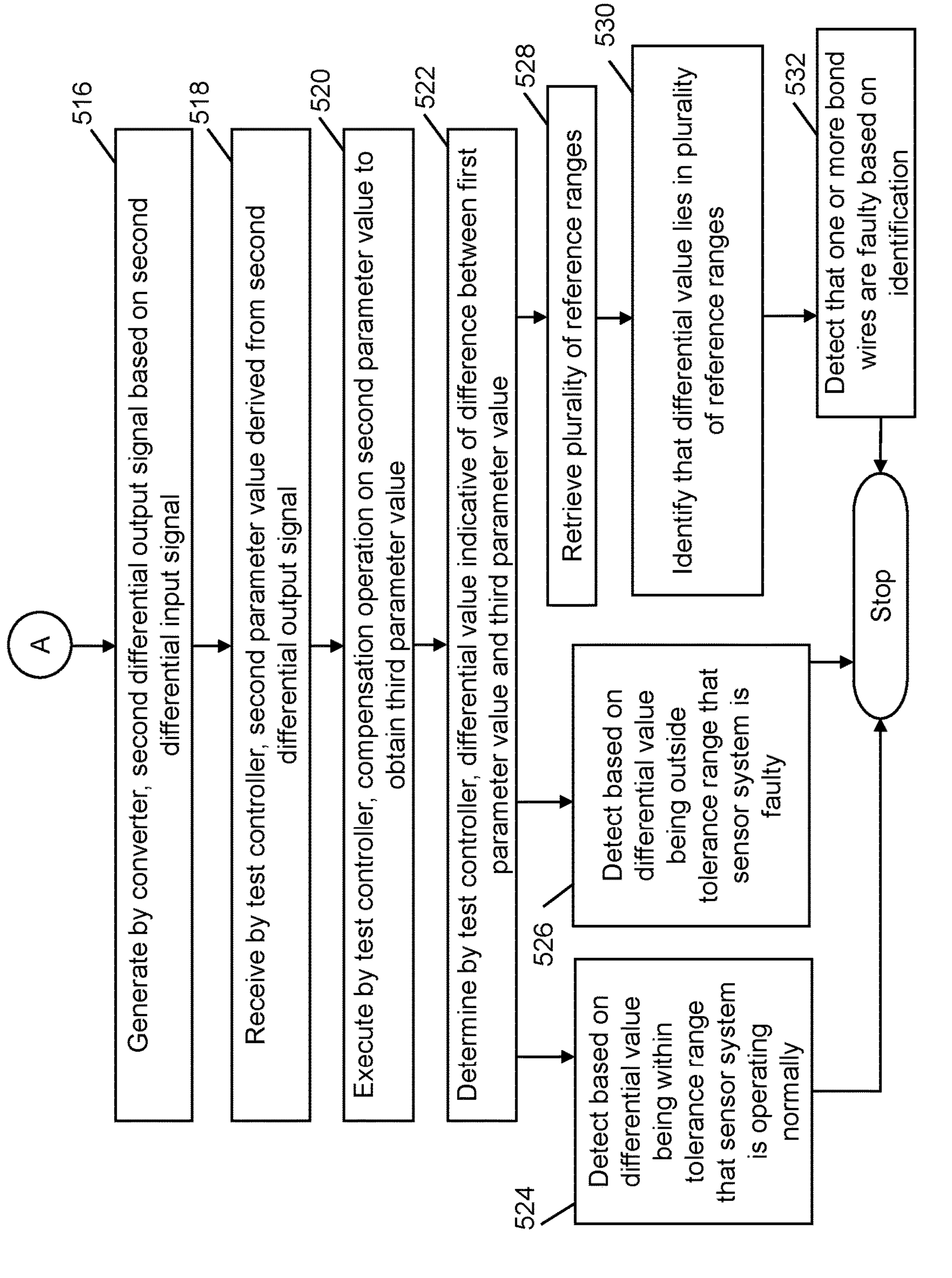

FIGS. 5A-5B, collectively, represent a flowchart 500 that illustrates a method for fault detection, in accordance with an embodiment of the present disclosure. The method may be executed by the electronic device 100.

Referring now to FIG. 5A, at step 502, the switching circuit 106 may be configured to couple the first sensing element CS1 (e.g., the first sensing capacitor CS1), the second sensing element CS2 (e.g., the second sensing capacitor CS2), the first reference element CR1 (e.g., the first reference capacitor CR1), and the second reference element CR2 (e.g., the second reference capacitor CR2) to the converter 110 during the normal mode. For example, the first test enable switch S1 and the second test enable switch S2 may be configured to selectively couple the voltage controller 120 to the first sensing capacitor CS1 and the second sensing capacitor CS2, respectively. At step 504, the switching circuit 106 may control the charging of the first sensing element CS1 and the second sensing element CS2 during the normal mode to generate and provide the first differential input signal VI1 and VI2 (e.g., the first differential input voltage VI1 and VI2) to the converter 110. For example, the plurality of toggle switches X5-X10 may control the charging of the first sensing element CS1 and the second sensing element CS2 during the normal mode.

At step 506, the converter 110 may generate the first differential output signal VA1 and VA2 (e.g., the first differential output voltage VA1 and VA2) based on the first differential input signal VI1 and VI2. At step 508, the test controller 116 may receive the first parameter value PV1 derived from the first differential output signal VA1 and VA2. The first parameter value PV1 may be indicative of the pressure sensed by the sensor 102. At step 510, it is determined whether the plurality of test enable signals TE1-TE4 are indicative of the fault diagnosis mode, by the switching circuit 106. If at step 510, it is determined that the plurality of test enable signals TE1-TE4 are not indicative of the fault diagnosis mode, step 502 is performed. If at step 510, the switching circuit 106 determines that the plurality of test enable signals TE1-TE4 are indicative of the fault diagnosis mode, step 512 is performed.

At step 512, the switching circuit 106 may selectively couple one of (i) the first test element CT1 (e.g., the first test capacitor CT1) and the second sensing element CS2, and (ii) the second test element CT2 (e.g., the second test capacitor CT2) and the first sensing element CS1 and the first reference element CR1 and the second reference element CR2 to the converter 110 during the fault diagnosis mode based on assertion of at least one of the plurality of test enable signals TE1-TE4. For example, the switching circuit 106 may selectively couple the first test capacitor CT1 and the second sensing capacitor CS2 to the converter 110 upon receiving the asserted second test enable signal TE2 and the asserted fourth test enable signal TE4. At step 514, the switching circuit 106 may control the charging of one of (i) the first test element CT1 and the second sensing element CS2 and (ii) the second test element CT2 and the first sensing element CS1, during fault diagnosis mode to generate and provide the second differential input signal VI3 and VI4 (e.g., the second differential input voltage VI3 and VI4) to the converter 110. For example, the plurality of toggle switches X5-X10 may control the charging of one of (i) the first test element CT1 and the second sensing element CS2 and (ii) the second test element CT2 and the first sensing element CS1, during the fault diagnosis mode.

At step 516, the converter 110 may generate the second differential output signal VB1 and VB2 (e.g., the second differential output voltage VB1 and VB2) based on the second differential input signal VI3 and VI4. At step 518, the test controller 116 may receive the second parameter value PV2 derived from the second differential output signal VB1 and VB2. At step 520, the test controller 116 may execute the compensation operation on the second parameter value PV2 to obtain the third parameter value. The compensation operation may be executed when the plurality of test enable signals TE1-TE4 are indicative of the fault diagnosis mode. At step 522, the test controller 116 may determine the differential value indicative of the difference between the first parameter value PV1 and the third parameter value. After step 522, step 524, step 526, and step 528 are executed. At step 524, the test controller 116 may detect that the sensing circuit 104 is operating normally, based on the differential value being within the tolerance range. At step 526, based on the differential value being outside the tolerance range, the test controller 116 may detect that the sensor 102 is faulty. At step 528, the test controller 116 may retrieve the plurality of reference ranges that are indicative of the fault in at least one bond wire of the plurality of bond wires B1-B6. At step 530, the test controller 116 may identify that the differential value lies in the plurality of reference ranges. At step 532, the test controller 116 may detect that one or more bond wires are faulty based on the identification.

The sensing circuit 104 is capable of precisely determining the fault in one of the first sensing element CS1 and the second sensing element CS2 by selectively coupling one of the first test element CT1 and the second sensing element CS2, and the second test element CT2 and the first sensing element CS1. Additionally, the sensing circuit 104 is able to determine the fault in one or more plurality of bond wires B1-B6 that couple the sensor 102 to the sensing circuit 104 by identifying whether the differential value lies in the plurality of reference ranges. Thus, the sensing circuit 104 is able to detect a root cause of an output of the sensor 102 being faulty which may be due to one or more faulty sensing elements or one or more faulty bond wires.

In the present disclosure, the term "assert" is used to mean placing a signal in an active state. For example, for an active-low signal, the signal is at a logic-low state when asserted, and for an active-high signal, the signal is at a logic-high state when asserted.

In an embodiment, a sensing circuit may comprise a switching circuit coupled to a sensor, wherein the sensor may comprise a first sensing element and a second sensing element. A test circuit of the sensing circuit may comprise a first test element and a second test element, wherein the switching circuit is coupled between the sensor and the test circuit. A converter of the sensing circuit may be coupled to the switching circuit, wherein during a normal mode of the sensing circuit, the switching circuit may be configured to selectively couple the first sensing element and the second sensing element to the converter such that the converter is configured to generate a first differential output signal, according to an embodiment. During a fault diagnosis mode of the sensing circuit, the switching circuit may be configured to selectively couple one of a group consisting of (i) the first test element and the second sensing element and (ii) the second test element and the first sensing element, to the converter such that the converter is configured to generate a second differential output signal, according to an embodiment. In an embodiment, the first differential output signal and the second differential output signal may be processed to detect a fault associated with the sensor.

In some embodiments, a physical parameter may be sensed by the first sensing element and the second sensing element, wherein an attribute of the first sensing element and an attribute of the second sensing element is a function of the physical parameter, and wherein an attribute of the first test element and an attribute of the second test element are independent of the physical parameter.

In some embodiments, the physical parameter may be one of a group consisting of pressure, temperature, speed, humidity, proximity, magnetic field, flow rate, sound, pH level, and acceleration.

In some embodiments, the attribute of each of the first sensing element, the second sensing element, the first test element, and the second test element is one of a group consisting of capacitance, resistance, inductance, frequency, amplitude, orientation, phase shift, optical characteristics, current, and voltage.

In some embodiments, the first differential output signal may be generated based on the attribute of the first sensing element and the attribute of the second sensing element during the normal mode, and wherein during the fault diagnosis mode, the second differential output signal may be generated based on one of a group consisting of (i) the attribute of the first test element and the attribute of the second sensing element, and (ii) the attribute of the second test element and the attribute of the first sensing element.

In some embodiments, the sensor may further comprise a first reference element and a second reference element that are coupled to the first sensing element and the second sensing element, respectively, wherein an attribute of the first reference element and an attribute of the second reference element are independent of the physical parameter, and wherein each of the first differential output signal and the second differential output signal is further generated based on the attribute of the first reference element and the attribute of the second reference element.

In some embodiments, the sensor may further comprise a plurality of bond wires, wherein the first sensing element and the second sensing element are coupled to the switching circuit by way of the plurality of bond wires, and wherein the fault associated with the sensor corresponds to one of a group consisting of (i) a bond wire fault that is associated with at least one of the plurality of bond wires and (ii) a sensor fault that is associated with at least one of a group consisting of the first sensing element and the second sensing element.

In some embodiments, the switching circuit may comprise a first test enable switch coupled between the converter and the first sensing element, a second test enable switch coupled between the converter and the second sensing element, a third test enable switch coupled between the converter and the first test element, and a fourth test enable switch coupled between the converter and the second test element, wherein the first test enable switch and the second test enable switch are closed to selectively couple the first sensing element and the second sensing element to the converter, respectively. When the first test enable switch and the second test enable switch are closed and the third test enable switch and the fourth test enable switch are open, the sensing circuit is in the normal mode, wherein one of a group consisting of (i) the second test enable switch and the third test enable switch are closed to selectively couple the first test element and the second sensing element to the converter, and (ii) the first test enable switch and the fourth test enable switch are closed to selectively couple the second test element and the first sensing element to the converter. When one of a group consisting of (i) the second test enable switch and the third test enable switch are closed and the first test enable switch and the fourth test enable switch are open, and (ii) the first test enable switch and the fourth test enable switch are closed and the second test enable switch and the third test enable switch are open, the sensing circuit is in the fault diagnosis mode.

In some embodiments, a test controller may be configured to receive (i) a first parameter value of a physical parameter that is derived from the first differential output signal and (ii) a second parameter value of the physical parameter that is derived from the second differential output signal, execute a compensation operation on the second parameter value to obtain a third parameter value that is a compensated version of the second parameter value, determine a differential value that is indicative of a difference between the first parameter value and the third parameter value, and detect the fault associated with the sensor based on the differential value, wherein the test controller may detect that the sensor is operating normally when the differential value is within a tolerance range, and wherein the test controller may detect that the sensor is faulty when the differential value is outside the tolerance range.

In some embodiments, the sensing circuit may further comprise (i) an analog-to-digital converter (ADC) that may be coupled to the converter and (ii) a processing circuit that may be coupled to the ADC and the test controller, wherein during the normal mode, (i) the ADC is configured to generate a first digital code that corresponds to a digitized version of the first differential output signal, and (ii) the processing circuit is configured to execute one or more processing operations on the first digital code to generate the first parameter value. The one or more processing operations correspond to one of a group consisting of a filtering operation and a trimming operation, and wherein during the fault diagnosis mode, (i) the ADC is further configured to generate a second digital code that corresponds to a digitized version of the second differential output signal, and (ii) the processing circuit is configured to execute the one or more processing operations on the second digital code to generate the second parameter value.

In some embodiments, the test controller may be further configured to detect that (i) the first sensing element is faulty when the differential value is within the first predetermined range, and (ii) the second sensing element is faulty when the differential value is within the second predetermined range that is different from the first predetermined range.

In some embodiments, the fault associated with the sensor may correspond to a bond wire fault in one of a plurality of bond wires that couple the first sensing element and the second sensing element to the switching circuit. To detect the bond wire fault, the test controller may be further configured to retrieve a plurality of reference ranges, wherein each reference range is indicative of a fault in at least one bond wire of the plurality of bond wires, identify that the differential value lies in the plurality of reference ranges, and detect, based on the identification, one or more bond wires that are faulty.

In some embodiments, the converter may further comprise a regulator, and wherein during the normal mode, the regulator may be coupled to the first sensing element and the second sensing element and may be configured to receive and regulate a common mode of the first differential input signal, and during the fault diagnosis mode, the regulator may be coupled to one of a group consisting of (i) the first test element and the second sensing element, and (ii) the second test element and the first sensing element. The regulator may be configured to receive and regulate a common mode of the second differential input signal.

In some embodiments, the converter may further comprise a differential amplifier that may be coupled to the regulator. During the normal mode, the switching circuit may be further configured to receive a common mode signal, a positive excitation signal, and a negative excitation signal to charge the first sensing element and the second sensing element such that the first differential input signal may be provided to the regulator. The differential amplifier is configured to generate the first differential output signal based on a common mode regulation of the first differential input signal.

In some embodiments, the converter may further comprise a differential amplifier that may be coupled to the regulator, wherein during the fault diagnosis mode, the switching circuit may be further configured to receive a common mode signal, a positive excitation signal, and a negative excitation signal to charge one of the group consisting of (i) the first test element and the second sensing element, and (ii) the second test element and the first sensing element such that the second differential input signal may be provided to the regulator, and wherein the differential amplifier is configured to generate the second differential output signal based on a common mode regulation of the second differential input signal.

In some embodiments, the switching circuit may comprise a plurality of toggle switches that may be coupled to the sensor and the test circuit, wherein when a position of the plurality of toggle switches control, a charging of the first sensing element and the second sensing element during the normal mode to generate a first differential input signal, wherein the first differential output signal may be generated based on the first differential input signal. A charging of one of the group consisting of (i) the first test element and the second sensing element, and (ii) the second test element and the first sensing element during the fault diagnosis mode may be controlled to generate the second differential input signal, wherein the second differential output signal is generated based on the second differential input signal.

In another embodiment, a method to detect faults by a sensing circuit may comprise selectively coupling by a switching circuit of the sensing circuit, during a normal mode of the sensing circuit, the first sensing element and the second sensing element to a converter of the sensing circuit to provide a first differential input signal to the converter. During a fault diagnosis mode of the sensing circuit, one of a group consisting of (i) a first test element and the second sensing element and (ii) a second test element and the first sensing element to the converter is coupled by the switching circuit, to provide a second differential input signal to the converter, wherein the first sensing element and the second sensing element may be included in a sensor. The method may comprise generating by the converter, a first differential output signal based on the first differential input signal, and a second differential output signal based on the second differential input signal. The method may comprise detecting by a test controller of the sensing circuit, a fault associated with one of a group consisting of the first sensing element and the second sensing element based on processing of the first differential output signal and the second differential output signal.

In some embodiments, the method further comprises receiving, by the test controller, (i) a first parameter value of a physical parameter that is derived from the first differential output signal and (ii) a second parameter value of the physical parameter that is derived from the second differential output signal, executing, by the test controller, a compensation operation on the second parameter value to obtain a third parameter value that is a compensated version of the second parameter value, determining, by the test controller, a differential value indicative of a difference between the first parameter value and the third parameter value, and detecting, by the test controller, one of (i) based on the differential value being within a tolerance range that the sensor is operating normally, and (ii) based on the differential value being outside the tolerance range that the sensor is faulty.

In some embodiments, the method further comprises retrieving, by the test controller, a plurality of reference ranges, wherein each reference range is indicative of a fault in at least one bond wire of a plurality of bond wires. The method further comprises identifying, by the test controller, that the differential value lies in the plurality of reference ranges, and detecting, by the test controller, based on the identification, one or more bond wires that are faulty.

In some embodiments, the method further comprises controlling, by the switching circuit, a charging of the first sensing element and the second sensing element during the normal mode to generate the first differential input signal, and controlling, by the switching circuit, a charging of one of the group consisting of (i) the first test element and the second sensing element, and (ii) the second test element and the first sensing element during the fault diagnosis mode, to generate the second differential input signal.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

What is claimed is:

1. A sensing circuit, comprising:

a switching circuit coupled to a sensor, wherein the sensor comprises a first sensing element and a second sensing element;

a test circuit comprising a first test element and a second test element, wherein the switching circuit is coupled between the sensor and the test circuit; and a converter coupled to the switching circuit, wherein during a normal mode of the sensing circuit, the switching circuit is configured to selectively couple the first sensing element and the second sensing element to the converter such that the converter is configured to generate a first differential output signal, wherein during a fault diagnosis mode of the sensing circuit, the switching circuit is configured to selectively couple one of a group consisting of (i) the first test element and the second sensing element and (ii) the second test element and the first sensing element, to the converter such that the converter is configured to generate a second differential output signal, and wherein the first differential output signal and the second differential output signal are processed to detect a fault associated with the sensor.

2. The sensing circuit of claim 1, wherein a physical parameter is sensed by the first sensing element and the second sensing element, wherein an attribute of the first sensing element and an attribute of the second sensing element is a function of the physical parameter, and wherein an attribute of the first test element and an attribute of the second test element are independent of the physical parameter.

3. The sensing circuit of claim 2, wherein the physical parameter is one of a group consisting of pressure, temperature, speed, humidity, proximity, magnetic field, flow rate, sound, pH level, and acceleration.

4. The sensing circuit of claim 2, wherein the attribute of each of the first sensing element, the second sensing element, the first test element, and the second test element is one of a group consisting of capacitance, resistance, inductance, frequency, amplitude, orientation, phase shift, optical characteristics, current, and voltage.

5. The sensing circuit of claim 2, wherein the first differential output signal is generated based on the attribute of the first sensing element and the attribute of the second sensing element during the normal mode, and wherein during the fault diagnosis mode, the second differential output signal is generated based on one of a group consisting of (i) the attribute of the first test element and the attribute of the second sensing element and (ii) the attribute of the second test element and the attribute of the first sensing element.

6. The sensing circuit of claim 2, wherein the sensor further comprises a first reference element and a second reference element that are coupled to the first sensing element and the second sensing element, respectively, wherein an attribute of the first reference element and an attribute of the second reference element are independent of the physical parameter, and wherein each of the first differential output signal and the second differential output signal is further generated based on the attribute of the first reference element and the attribute of the second reference element.

7. The sensing circuit of claim 1, wherein the sensor further comprises a plurality of bond wires, wherein the first sensing element and the second sensing element are coupled to the switching circuit by way of the plurality of bond wires, and wherein the fault associated with the sensor corresponds to one of a group consisting of (i) a bond wire fault that is associated with at least one of the plurality of bond wires and (ii) a sensor fault that is associated with at least one of a group consisting of the first sensing element and the second sensing element.

8. The sensing circuit of claim 1, wherein the switching circuit comprises a first test enable switch coupled between the converter and the first sensing element, a second test enable switch coupled between the converter and the second sensing element, a third test enable switch coupled between the converter and the first test element, and a fourth test enable switch coupled between the converter and the second test element, wherein the first test enable switch and the second test enable switch are closed to selectively couple the first sensing element and the second sensing element to the converter, respectively, wherein when the first test enable switch and the second test enable switch are closed and the third test enable switch and the fourth test enable switch are open, the sensing circuit is in the normal mode, wherein one of a group consisting of (i) the second test enable switch and the third test enable switch are closed to selectively couple the first test element and the second sensing element to the converter, and (ii) the first test enable switch and the fourth test enable switch are closed to selectively couple the second test element and the first sensing element to the converter, and wherein when one of a group consisting of (i) the second test enable switch and the third test enable switch are closed and the first test enable switch and the fourth test enable switch are open, and (ii) the first test enable switch and the fourth test enable switch are closed and the second test enable switch and the third test enable switch are open, the sensing circuit is in the fault diagnosis mode.

9. The sensing circuit of claim 1, further comprising a test controller configured to:

receive (i) a first parameter value of a physical parameter that is derived from the first differential output signal and (ii) a second parameter value of the physical parameter that is derived from the second differential output signal;

execute a compensation operation on the second parameter value to obtain a third parameter value that is a compensated version of the second parameter value;

determine a differential value that is indicative of a difference between the first parameter value and the third parameter value; and detect the fault associated with the sensor based on the differential value, wherein the test controller detects that the sensor is operating normally when the differential value is within a tolerance range, and wherein the test controller detects that the sensor is faulty when the differential value is outside the tolerance range.

10. The sensing circuit of claim 9, further comprising: (i) an analog-to-digital converter (ADC) that is coupled to the converter and (ii) a processing circuit that is coupled to the ADC and the test controller, wherein during the normal mode, (i) the ADC is configured to generate a first digital code that corresponds to a digitized version of the first differential output signal, and (ii) the processing circuit is configured to execute one or more processing operations on the first digital code to generate the first parameter value, wherein the one or more processing operations correspond to one of a group consisting of a filtering operation and a trimming operation, and wherein during the fault diagnosis mode, (i) the ADC is further configured to generate a second digital code that corresponds to a digitized version of the second differential output signal, and (ii) the processing circuit is configured to execute the one or more processing operations on the second digital code to generate the second parameter value.

11. The sensing circuit of claim 9, wherein the test controller is further configured to detect that (i) the first sensing element is faulty when the differential value is within a first predetermined range and (ii) the second sensing element is faulty when the differential value is within a second predetermined range that is different from the first predetermined range.

12. The sensing circuit of claim 9, wherein the fault associated with the sensor corresponds to a bond wire fault in one of a plurality of bond wires that couple the first sensing element and the second sensing element to the switching circuit, and wherein to detect the bond wire fault, the test controller is further configured to:

retrieve a plurality of reference ranges, wherein each reference range is indicative of a fault in at least one bond wire of the plurality of bond wires;

identify that the differential value lies in the plurality of reference ranges; and detect, based on the identification, one or more bond wires that are faulty.

13. The sensing circuit of claim 1, wherein the converter further comprises a regulator, and wherein during the normal mode, the regulator is coupled to the first sensing element and the second sensing element and configured to receive and regulate a common mode of a first differential input signal, and during the fault diagnosis mode, the regulator is coupled to one of the group consisting of (i) the first test element and the second sensing element, and (ii) the second test element and the first sensing element, and configured to receive and regulate a common mode of a second differential input signal.

14. The sensing circuit of claim 13, wherein the converter further comprises a differential amplifier that is coupled to the regulator, wherein during the normal mode, the switching circuit is further configured to receive a common mode signal, a positive excitation signal, and a negative excitation signal to charge the first sensing element and the second sensing element such that the first differential input signal is provided to the regulator, and wherein the differential amplifier is configured to generate the first differential output signal based on a common mode regulation of the first differential input signal.

15. The sensing circuit of claim 13, wherein the converter further comprises a differential amplifier that is coupled to the regulator, wherein during the fault diagnosis mode, the switching circuit is further configured to receive a common mode signal, a positive excitation signal, and a negative excitation signal to charge one of the group consisting of (i) the first test element and the second sensing element, and (ii) the second test element and the first sensing element such that the second differential input signal is provided to the regulator, and wherein the differential amplifier is configured to generate the second differential output signal based on a common mode regulation of the second differential input signal.

16. The sensing circuit of claim 1, wherein the switching circuit comprises a plurality of toggle switches that are coupled to the sensor and the test circuit, wherein when a position of the plurality of toggle switches control, a charging of the first sensing element and the second sensing element during the normal mode to generate a first differential input signal, wherein the first differential output signal is generated based on the first differential input signal, and a charging of one of the group consisting of (i) the first test element and the second sensing element, and (ii) the second test element and the first sensing element during the fault diagnosis mode, to generate a second differential input signal, wherein the second differential output signal is generated based on the second differential input signal.

17. A method to detect faults by a sensing circuit, comprising:

selectively coupling by a switching circuit of the sensing circuit, during a normal mode of the sensing circuit, a first sensing element and a second sensing element to a converter of the sensing circuit to provide a first differential input signal to the converter, and during a fault diagnosis mode of the sensing circuit, one of a group consisting of (i) a first test element and the second sensing element and (ii) a second test element and the first sensing element to the converter to provide a second differential input signal to the converter, wherein the first sensing element and the second sensing element are included in a sensor;

generating, by the converter, a first differential output signal based on the first differential input signal, and a second differential output signal based on the second differential input signal; and detecting, by a test controller of the sensing circuit, a fault associated with one of a group consisting of the first sensing element and the second sensing element based on processing of the first differential output signal and the second differential output signal.

18. The method of claim 17, further comprising:

receiving, by the test controller, (i) a first parameter value of a physical parameter that is derived from the first differential output signal and (ii) a second parameter value of the physical parameter that is derived from the second differential output signal;

executing, by the test controller, a compensation operation on the second parameter value to obtain a third parameter value that is a compensated version of the second parameter value;

determining, by the test controller, a differential value indicative of a difference between the first parameter value and the third parameter value; and detecting, by the test controller, one of (i) based on the differential value being within a tolerance range that the sensor is operating normally, and (ii) based on the differential value being outside the tolerance range that the sensor is faulty.

19. The method of claim 18, further comprising:

retrieving, by the test controller, a plurality of reference ranges, wherein each reference range is indicative of a fault in at least one bond wire of a plurality of bond wires;

identifying, by the test controller, that the differential value lies in the plurality of reference ranges; and detecting, by the test controller, based on the identification, one or more bond wires that are faulty.

20. The method of claim 17, further comprising:

controlling, by the switching circuit, a charging of the first sensing element and the second sensing element during the normal mode to generate the first differential input signal; and controlling, by the switching circuit, a charging of one of the group consisting of (i) the first test element and the second sensing element, and (ii) the second test element and the first sensing element during the fault diagnosis mode, to generate the second differential input signal.

* * * * *